US008913667B2

(12) United States Patent
Hsiun et al.

(10) Patent No.: US 8,913,667 B2
(45) Date of Patent: Dec. 16, 2014

(54) VIDEO DECODING SYSTEM HAVING A PROGRAMMABLE VARIABLE-LENGTH DECODER

(75) Inventors: Vivian Hsiun, Yorba Linda, CA (US); Alexander G. MacInnis, Los Altos, CA (US); Xiaodong Xie, Fremont, CA (US)

(73) Assignee: Broadcom Corporation, Irvine, CA (US)

( * ) Notice: Subject to any disclaimer, the term of this patent is extended or adjusted under 35 U.S.C. 154(b) by 894 days.

(21) Appl. No.: 10/404,387

(22) Filed: Apr. 1, 2003

(65) Prior Publication Data

US 2004/0028141 A1 Feb. 12, 2004

Related U.S. Application Data

(63) Continuation-in-part of application No. 09/640,870, filed on Aug. 18, 2000, now Pat. No. 6,768,774, which is a continuation-in-part of application No. 09/437,208, filed on Nov. 9, 1999, now Pat. No. 6,570,579.

(60) Provisional application No. 60/170,866, filed on Dec. 14, 1999, provisional application No. 60/369,144, filed on Apr. 1, 2002.

(51) Int. Cl.
*H04N 7/18* (2006.01)
(Continued)

(52) U.S. Cl.
CPC ......... *H04N 9/641* (2013.01); *G09G 2360/125* (2013.01);
(Continued)

(58) Field of Classification Search
CPC . H04N 7/50; H04N 7/26335; H04N 7/26707; H04N 7/26946

USPC .................................. 375/240.01–240.29
See application file for complete search history.

(56) References Cited

U.S. PATENT DOCUMENTS 4,020,332 A   4/1977   Crochiere et al.
4,367,466 A   1/1983   Takeda et al.
(Continued)

FOREIGN PATENT DOCUMENTS

EP   0663762        7/1995
EP   0746116 A2    12/1996
(Continued)

OTHER PUBLICATIONS

U.S. Appl. No. 09/437,208 entitled "Graphics Display System", filed Nov. 9, 1999, Inventor: Alexander G. MacInnis et al.

(Continued)

*Primary Examiner* — Andy Rao
(74) *Attorney, Agent, or Firm* — Foley & Lardner LLP

(57) ABSTRACT

Video decoding system having a programmable variable-length decoding accelerator. The system includes a decoder processor and a variable-length decoding accelerator. The variable-length decoding accelerator is coupled to the decoder processor and performs variable-length decoding operations on variable-length code in the video data stream. The variable-length decoding accelerator is capable of decoding variable-length code according to any of a plurality of decoding methods. In one embodiment, the variable-length decoder includes a plurality of code tables stored in memory and a code table selection register that is programmable to dictate which of the plurality of code tables is to be utilized to decode variable-length code. In one embodiment, the decoding system includes two variable-length decoding accelerators.

24 Claims, 13 Drawing Sheets

(51) Int. Cl.
  *H04N 19/12*     (2014.01)
  *H04N 19/82*     (2014.01)
  *G06F 9/38*      (2006.01)
  *H04N 19/70*     (2014.01)
  *H04N 5/445*     (2011.01)
  *G09G 5/14*      (2006.01)
  *H04N 19/423*    (2014.01)
  *H04N 19/129*    (2014.01)
  *H04N 19/157*    (2014.01)
  *H04N 9/64*      (2006.01)
  *H04N 19/60*     (2014.01)
  *H04N 19/91*     (2014.01)
  *G09G 5/36*      (2006.01)
  *H04N 19/44*     (2014.01)
  *H04N 19/90*     (2014.01)
  *H04N 19/122*    (2014.01)
  *H04N 19/176*    (2014.01)
  *H04N 19/61*     (2014.01)
  *G09G 5/06*      (2006.01)
  *G09G 5/28*      (2006.01)
  *G09G 5/34*      (2006.01)
  *G09G 5/12*      (2006.01)

(52) U.S. Cl.
  CPC ... *H04N 19/00078* (2013.01); *H04N 19/00896* (2013.01); *G09G 5/06* (2013.01); *G09G 2310/0224* (2013.01); *G06F 9/3877* (2013.01); *H04N 19/00884* (2013.01); *H04N 5/44504* (2013.01); *G09G 5/14* (2013.01); *H04N 19/00484* (2013.01); *G09G 2340/10* (2013.01); *H04N 19/00109* (2013.01); *G09G 5/28* (2013.01); *H04N 19/00212* (2013.01); *G06F 9/3861* (2013.01); *G09G 2340/0407* (2013.01); *G09G 5/346* (2013.01); *H04N 19/00775* (2013.01); *H04N 19/00951* (2013.01); *G09G 5/36* (2013.01); *H04N 19/00533* (2013.01); *H04N 19/00945* (2013.01); *H04N 19/00084* (2013.01); *G09G 2340/125* (2013.01); *G09G 5/12* (2013.01); *H04N 19/00278* (2013.01); *H04N 19/00781* (2013.01)
  USPC .................. 375/240.23; 375/240.25

(56) References Cited

U.S. PATENT DOCUMENTS

| | | | |
|---|---|---|---|
| 4,532,547 A | 7/1985 | Bennett | |
| 4,679,040 A | 7/1987 | Yan | |
| 4,688,033 A | 8/1987 | Carini et al. | |
| 4,954,970 A | 9/1990 | Walker et al. | |
| 4,959,718 A | 9/1990 | Bennett | |
| 4,967,392 A | 10/1990 | Werner et al. | |
| 5,043,714 A | 8/1991 | Perlman | |
| 5,097,257 A | 3/1992 | Clough et al. | |
| 5,122,875 A * | 6/1992 | Raychaudhuri et al. | 348/390.1 |
| 5,142,273 A | 8/1992 | Wobermin | |
| 5,155,816 A | 10/1992 | Kohn | |
| 5,173,695 A * | 12/1992 | Sun et al. | 341/67 |
| 5,258,747 A | 11/1993 | Oda et al. | |
| 5,262,854 A | 11/1993 | Ng | |
| 5,307,177 A | 4/1994 | Shibata et al. | |
| 5,384,912 A | 1/1995 | Ogrinc et al. | |
| 5,396,567 A | 3/1995 | Jass | |
| 5,398,211 A | 3/1995 | Willenz et al. | |
| 5,404,447 A | 4/1995 | Drako et al. | |
| 5,418,535 A | 5/1995 | Masucci et al. | |
| 5,432,900 A | 7/1995 | Rhodes et al. | |
| 5,434,683 A | 7/1995 | Sekine et al. | |
| 5,434,957 A | 7/1995 | Moller | |
| 5,467,144 A | 11/1995 | Saeger et al. | |
| 5,469,273 A * | 11/1995 | Demura | 382/244 |
| 5,471,411 A | 11/1995 | Adams et al. | |
| 5,515,077 A | 5/1996 | Tateyama | |
| 5,526,054 A | 6/1996 | Greenfield et al. | |
| 5,528,628 A * | 6/1996 | Park et al. | 375/240 |
| 5,533,182 A | 7/1996 | Bates et al. | |
| 5,546,103 A | 8/1996 | Rhodes et al. | |
| 5,550,594 A | 8/1996 | Cooper et al. | |
| 5,570,296 A | 10/1996 | Heyl et al. | |
| 5,577,187 A | 11/1996 | Mariani | |
| 5,600,364 A | 2/1997 | Hendricks et al. | |
| 5,604,514 A | 2/1997 | Hancock | |
| 5,610,657 A | 3/1997 | Zhang | |
| 5,614,952 A | 3/1997 | Boyce et al. | |
| 5,615,376 A | 3/1997 | Ranganathan | |
| 5,619,337 A | 4/1997 | Naimpally | |
| 5,621,869 A | 4/1997 | Drews | |
| 5,621,906 A | 4/1997 | O'Neill et al. | |
| 5,625,611 A | 4/1997 | Yokota et al. | |
| 5,625,764 A | 4/1997 | Tsujimoto et al. | |
| 5,635,985 A | 6/1997 | Boyce et al. | |
| 5,638,501 A | 6/1997 | Gough et al. | |
| 5,640,543 A | 6/1997 | Farrell et al. | |
| 5,664,162 A | 9/1997 | Dye | |
| 5,682,156 A * | 10/1997 | Suda | 341/67 |
| 5,694,143 A | 12/1997 | Fielder et al. | |
| 5,696,527 A | 12/1997 | King et al. | |
| 5,706,478 A | 1/1998 | Dye | |
| 5,708,511 A | 1/1998 | Gandhi et al. | |
| 5,708,764 A | 1/1998 | Borrel et al. | |
| 5,719,593 A | 2/1998 | De Lange | |
| 5,727,084 A | 3/1998 | Pan et al. | |
| 5,742,779 A | 4/1998 | Steele et al. | |
| 5,745,095 A | 4/1998 | Parchem et al. | |
| 5,748,983 A | 5/1998 | Gulick et al. | |
| 5,751,979 A | 5/1998 | McCrory | |
| 5,754,185 A | 5/1998 | Hsiao et al. | |
| 5,757,377 A | 5/1998 | Lee et al. | |
| 5,758,177 A | 5/1998 | Gulick et al. | |
| 5,761,516 A | 6/1998 | Rostoker et al. | |
| 5,764,238 A | 6/1998 | Lum et al. | |
| 5,768,429 A * | 6/1998 | Jabbi et al. | 382/233 |
| 5,790,136 A | 8/1998 | Hoffert et al. | |
| 5,790,795 A | 8/1998 | Hough | |
| 5,790,842 A | 8/1998 | Charles et al. | |
| 5,793,445 A | 8/1998 | Lum et al. | |
| 5,808,570 A * | 9/1998 | Bakhmutsky | 341/65 |
| 5,809,270 A | 9/1998 | Robbins et al. | |
| 5,815,137 A | 9/1998 | Weatherford et al. | |
| 5,815,206 A | 9/1998 | Malladi et al. | |
| 5,828,383 A | 10/1998 | May et al. | |
| 5,831,615 A | 11/1998 | Drews et al. | |
| 5,844,608 A | 12/1998 | Yu et al. | |
| 5,864,345 A | 1/1999 | Wickstrom et al. | |
| 5,867,166 A | 2/1999 | Myhrvold et al. | |
| 5,870,622 A | 2/1999 | Gulick et al. | |
| 5,874,967 A | 2/1999 | West et al. | |
| 5,894,300 A | 4/1999 | Takizawa | |
| 5,914,728 A | 6/1999 | Yamagishi et al. | |
| 5,920,572 A | 7/1999 | Washington et al. | |
| 5,920,682 A | 7/1999 | Shu et al. | |
| 5,923,316 A | 7/1999 | Kitamura et al. | |
| 5,923,385 A | 7/1999 | Mills et al. | |
| 5,926,647 A | 7/1999 | Adams et al. | |
| 5,940,089 A | 8/1999 | Dilliplane et al. | |
| 5,941,968 A | 8/1999 | Mergard et al. | |
| 5,949,432 A | 9/1999 | Gough et al. | |
| 5,949,439 A | 9/1999 | Ben-Yoseph et al. | |
| 5,951,644 A | 9/1999 | Creemer | |
| 5,956,041 A | 9/1999 | Koyamada et al. | |
| 5,959,626 A | 9/1999 | Garrison et al. | |
| 5,959,637 A | 9/1999 | Mills et al. | |
| 5,960,464 A | 9/1999 | Lam | |
| 5,963,201 A | 10/1999 | McGreggor et al. | |
| 5,963,260 A * | 10/1999 | Bakhmutsky | 375/240.24 |
| 5,963,262 A | 10/1999 | Ke et al. | |
| 5,977,933 A | 11/1999 | Wicher et al. | |
| 5,978,509 A | 11/1999 | Nachtergaele et al. | |
| 5,982,381 A | 11/1999 | Joshi et al. | |

(56) References Cited

U.S. PATENT DOCUMENTS

| | | | |
|---|---|---|---|
| 5,982,459 A | 11/1999 | Fandrianto et al. | |
| 5,987,555 A | 11/1999 | Alzien et al. | |
| 6,002,411 A | 12/1999 | Dye | |
| 6,002,882 A | 12/1999 | Garde | |
| 6,005,546 A | 12/1999 | Keene | |
| 6,006,303 A | 12/1999 | Barnaby et al. | |
| 6,009,203 A * | 12/1999 | Liu et al. | 382/233 |
| 6,018,803 A | 1/2000 | Kardach | |
| 6,023,302 A | 2/2000 | MacInnis et al. | |
| 6,023,738 A | 2/2000 | Priem et al. | |
| 6,028,583 A | 2/2000 | Hamburg | |
| 6,038,031 A | 3/2000 | Murphy | |
| 6,046,740 A | 4/2000 | LaRoche et al. | |
| 6,052,415 A | 4/2000 | Carr et al. | |
| 6,064,676 A | 5/2000 | Slattery et al. | |
| 6,078,305 A | 6/2000 | Mizutani | |
| 6,081,854 A | 6/2000 | Priem et al. | |
| 6,088,046 A | 7/2000 | Larson et al. | |
| 6,088,355 A | 7/2000 | Mills et al. | |
| 6,092,124 A | 7/2000 | Priem et al. | |
| 6,094,226 A | 7/2000 | Ke et al. | |
| 6,098,046 A | 8/2000 | Cooper et al. | |
| 6,100,826 A | 8/2000 | Jeon et al. | |
| 6,100,899 A | 8/2000 | Ameline et al. | |
| 6,105,048 A | 8/2000 | He | |
| 6,108,014 A | 8/2000 | Dye | |
| 6,111,896 A | 8/2000 | Slattery et al. | |
| 6,121,978 A | 9/2000 | Miler | |
| 6,124,885 A | 9/2000 | Mooney et al. | |
| 6,125,410 A | 9/2000 | Salbaum et al. | |
| 6,133,901 A | 10/2000 | Law | |
| 6,151,030 A | 11/2000 | DeLeeuw et al. | |
| 6,151,074 A | 11/2000 | Werner | |
| 6,157,415 A | 12/2000 | Glen | |
| 6,157,978 A | 12/2000 | Ng et al. | |
| 6,160,989 A | 12/2000 | Hendricks et al. | |
| 6,167,498 A | 12/2000 | Larson et al. | |
| 6,169,843 B1 | 1/2001 | Lenihan et al. | |
| 6,184,908 B1 | 2/2001 | Chan et al. | |
| 6,189,064 B1 | 2/2001 | MacInnis et al. | |
| 6,199,131 B1 | 3/2001 | Melo et al. | |
| 6,204,859 B1 | 3/2001 | Jouppi et al. | |
| 6,205,260 B1 | 3/2001 | Crinon et al. | |
| 6,208,354 B1 | 3/2001 | Porter | |
| 6,212,590 B1 | 4/2001 | Melo et al. | |
| 6,229,550 B1 | 5/2001 | Gloudemans et al. | |
| 6,239,810 B1 | 5/2001 | Van Hook et al. | |
| 6,252,608 B1 | 6/2001 | Snyder et al. | |
| 6,263,019 B1 | 7/2001 | Ryan | |
| 6,263,396 B1 | 7/2001 | Cottle et al. | |
| 6,266,753 B1 | 7/2001 | Hicok et al. | |
| 6,268,072 B1 | 7/2001 | Zheng et al. | |
| 6,269,051 B1 | 7/2001 | Funaba et al. | |
| 6,269,107 B1 | 7/2001 | Jong | |
| 6,271,826 B1 | 8/2001 | Pol et al. | |
| 6,311,204 B1 | 10/2001 | Mills | |
| 6,320,619 B1 | 11/2001 | Jiang | |
| 6,326,984 B1 | 12/2001 | Chow et al. | |
| 6,327,000 B1 | 12/2001 | Auld et al. | |
| 6,335,746 B1 | 1/2002 | Enokida et al. | |
| 6,337,703 B1 | 1/2002 | Konar et al. | |
| 6,339,386 B1 | 1/2002 | Cho | |
| 6,342,892 B1 | 1/2002 | Van Hook et al. | |
| 6,351,471 B1 | 2/2002 | Robinett et al. | |
| 6,351,474 B1 | 2/2002 | Robinett et al. | |
| 6,362,827 B1 | 3/2002 | Ohba | |
| 6,380,945 B1 | 4/2002 | MacInnis et al. | |
| 6,411,333 B1 | 6/2002 | Auld et al. | |
| 6,414,992 B1 * | 7/2002 | Sriram et al. | 375/240.13 |
| 6,507,293 B2 * | 1/2003 | Deeley et al. | 341/67 |
| 6,538,656 B1 | 3/2003 | Cheung et al. | 345/519 |
| 6,542,541 B1 | 4/2003 | Luna et al. | |
| 6,842,124 B2 | 1/2005 | Penna | |
| 6,963,613 B2 * | 11/2005 | MacInnis et al. | 375/240.25 |
| 7,075,462 B2 * | 7/2006 | Sudharsanan | 341/67 |
| 2001/0046260 A1 | 11/2001 | Molloy | |
| 2003/0235251 A1 | 12/2003 | Hsiun et al. | |

FOREIGN PATENT DOCUMENTS

| | | |
|---|---|---|
| EP | 0 752 695 | 1/1997 |
| EP | 0 840 505 | 5/1998 |
| EP | 0840276 A2 | 5/1998 |
| EP | 0840277 A2 | 5/1998 |
| GB | 2287627 A | 3/1995 |
| WO | WO 94/10541 | 5/1994 |
| WO | WO 00/28518 | 5/2000 |

OTHER PUBLICATIONS

U.S. Appl. No. 09/641,374 entitled "Video, Audio and Graphics Decode, Composite and Display System", filed Aug. 18, 2000, Inventor: Alexander G. MacInnis et al.

U.S. Appl. No. 09/641,936 entitled "Video and Graphics System With an MPEG Video Decoder for Concurrent Multi-Row Decoding", filed Aug. 18, 2000, Inventor: Ramanujan K. Valmiki et al.

U.S. Appl. No. 09/643,223 entitled "Video and Graphics System With MPEG Specific Data Transfer Commands", filed Aug. 18, 2000, Inventor: Ramanujan K. Valmiki et al.

U.S. Appl. No. 09/641,930 entitled "Video and Graphics System With a Video Transport Processor", filed Aug. 18, 2000, Inventor: Ramanujan K. Valmiki et al.

U.S. Appl. No. 09/641,935 entitled "Video and Graphics System With Parallel Processing of Graphics Windows", filed Aug. 18, 2000, Inventor: Alexander G. MacInnis et al.

U.S. Appl. No. 09/642,510 entitled "Video and Graphics System With a Single-Port RAM", filed Aug. 18, 2000, Inventor: Xiaodong Xie.

U.S. Appl. No. 09/642,458 entitled "Video and Graphics System With an Integrated System Bridge Controller", Inventor: Alexander G. MacInnis et al.

Plaintiff and Counterdefendant Qualcomm Incorporated's Preliminary Invalidity Contentions for U.S. Patent 6,501,480 and 6,570,579.

Thomas Porter & Tom Duff, "Compositing Digital Images", Computer Graphics, vol. 18, No. 3, Jul. 1984, pp. 253-259.

Akeley, K. & Jerrnoluk T., "High-Performance Polygon Rendering," 22 Computer Graphics No. 4 (ACM Aug. 1988).

Apgar, B., et el., "A Display System for the Stellar Graphics Superconductor Model GS1000," 22 Computer Graphics No. 4 (ACM Aug. 1988).

Asal, M.D., et al., "Novel Architecture for a High Performance Full Custom Graphics Processor," (IEEE 1989).

Awaga, M., et al., "3D Graphics Processor Chip Set," (IEEE Dec. 1995).

Cox, M. & Bhandarl, N., "Architectural Implications of Hardware-Accelerated Bucket Rendering on the PC," (Association for Computing Machinery SIGGRAPH/Eurographics Workshop 1997).

Cyrix Corporation Manual, copyrighted 1996, 1997, and all underlying development work.

Deering, M., et al., "The Triangle Processor and Normal Vector Shader: A VLSI System for High Performance Graphics," 22 Computer Graphics No. 4 (ACM Aug. 1998).

Donovan, W., et al., "Pixel Processing in a Memory Controller," (IEEE Computer Graphics and Applications 1995).

Dutton, T., "The Design of the DEC 3000 Model 500 AXP Workstation," (IEEE 1993).

Foley, James, D., et al., "Introduction to Computer Graphics," (Addison-Wesley Publishing Co. 1994) ("Introduction to Computer Graphics").

Galbi, D., et al., "An MPEG-1 Audio/Video Decoder with Run-Length Compressed Antialiased Video Overlays," (1995 IEEE International Solid-State Circuits Conference).

Glaskowsky, Peter, "Cylix Creates Ultimate CPU for Games," Microprocessor Report, Dec. 8, 1997.

Glaskowsky, Peter, "Intel Displays 740 Graphics Chip: Auburn Sets New Standard for Quality—But Not Speed," Microprocessor Report No. 2, Feb. 16, 1998.

(56) References Cited

OTHER PUBLICATIONS

Gwennap, L., "Verite: A Programmable 3D Chip: Rendition Uses Internal RISC CPU for Versatility, Performance," 10 Microprocessor Report No. 6, May 6, 1996.

Hosotanl S., et al., "A Display Processor Conforming to all DTV Formats with 188-TAP FIR Filters and 284 Kb FIFO Memories," (IEEE 1997 (Manuscript received Jun. 13, 1997)).

Knittel, G. & Straber, W., "VIZARD—Visualization Accelerator for Realtime Display," (Association for Computing Machinery SIG-GRAPH/Eurographics Workshop 1997).

Lewis, R., et al., "Delivering PCI in HP B-Class and C-Class Workstations: A Case Study in the Challenges of Interfacing with Industry Standards," (Hewlett-Packard Journal May 1998).

Manepally, R. & Sprague, D., "Intel's i750 (R) Video Processor—The Programmable Solution," (IEEE 1991).

McCormack, J., et al., "Neon: A Single-Chip 3D Workstation Graphics Accelerator," (SIGGRAPH Eurograph Workshop Graph Hardware Aug. 31-Sep. 1, 1998).

Norrod, F. & Wawrzynak, R., "A Multimedia-Enhanced x88 Processor, Digest of Technical Papers," ISSCC96 (Feb. 9, 1996).

Oguchi, T., et al., "A Single-Chip Graphic Display Controller," (1981 IEEE International Solid-State Circuits Conference).

Soferman, Z., et al., "Advanced Graphics Behind Medical Virtual Reality: Evolution of Algorithms, Hardware, and Software Interfaces," 86 Proceedings of the IEEE No. 3 (IEEE Mar. 1998 (Manuscript received Jul. 3, 1997)).

Scott, N., et al., "An Overview of the VISUALIZE fx Graphics Accelerator Hardware," (Hewlett-Packard Journal May 1998) and all underlying development work ("HP").

Sumi, M., et al., "A 40-Mpixel/s Bit Block Transfer Graphics Processor," (IEEE 1989).

Foley, James D., et al.; Computer Graphics: Principles and Practice; publication, 1996, 1990; The Systems Programming Series, 4 pages, Second Edition in C; Addison-Wesley Publishing Company, U.S.A.

Tobias. R. "The LR33020 GraphX Processor: A Single Chip X-Terminal Controller," (IEEE 1992).

Watkins, J., et al., A Memory Controller with an Integrated Graphics Processor (IEEE 1993).

Yao, Yong, "Samsung Launches Media Processor. MSP Is Designed for Microsoft's New 3D-Software Architecture," 10 Microprocessor Report No. 11, Aug. 26, 1996.

Yao, Yong, "Competition Heats Up in 3D Accelerators: Market Hungers for a Unified Multimedia Platform from Microsoft," 10 Microprocessor Report No. 15, Nov. 18, 1996.

Yao, Yong, "Chromatic's Mpact 2 Boosts 3D: Mpact/3000 Becomes First Media Processor to Ship in Volume," 10 Microprocessor Report No. 15, Nov. 18, 1996.

Motorola, Inc. MC92100 "Scorpion" Graphics Display Generator, SDRAM Controller, and Digital Video Encoder, 1997, 6 pages.

Power TV, Inc., Eagle™ Graphics/Audio Media Compositor Data Sheet, Version 1.7, Feb. 27, 1997, pp. 63.

Berekovic, M. & Pirsch, P., "Architecture of a Coprocessor Module for Image Compositing," (IEEE 1998).

Blinn, J., "Compositing, Part I: Theory," (IEEE Sep. 1994).

Blinn, Jim; Jim Blinn's Corner Dirty Pixels; publication; 1998; pp. 179-190; Chapter Sixteen; Morgan Kaufmann Publishers, Inc.; San Francisco, CA, U.S.A.

Jaspers, et al., "A Flexible Heterogeneous Video Processor System for Television Applications," (IEEE Sep. 25, 1998).

Li, R., et al., "A Flexible Display Module for DVD and Set-Top Box Applications," (IEEE Transactions on Consumer Electronics Aug. 1997 (Manuscript received Jun. 13. 1997)).

Ostermann, J., "Coding of Arbitrarily Shaped Objects with Binary and Greyscale Alpha-Maps: What Can MPEG-4 Do for You?," (Proceedings of the 1998 IEEE International Symposium on Circuits and Systems, May 31-Jun. 3, 1998, vol. 5).

Stytz, et al., "Three-Dimensional Medical Imaging: Algorithms and Computer Systems," (ACM Computing Surveys, Dec. 1991).

Wang, J. & Adelson, E., "Representing Moving Images with Layers," (IEEE Transactions on Image Processing, Sep. 1994).

Sun, Huifang et al., "A New Approach for Memory Efficient ATV Decoding," 1997 IEEE International Conference on Consumer Electronics, pp. 174-175, Los Angeles, 1997.

Bao, Jay et al., "HDTV Down-Conversion Decoder," IEEE Transactions on Consumer Electronics, pp. 402-410, vol. 42, No. 3, Aug. 1996.

Mokry, Robert et al., "Minimal Error Drift in Frequency Scalability for Motion-Compensated DCT Coding," IEEE Transactions on Circuits and Systems for Video Technology, pp. 392-406, vol. 4, No. 4, Aug. 1994.

Vetro, Anthony et al., "Minium Drift Architectures for 3-Layer Scalable DTV Decoding," IEEE Transactions on Consumer Electronics, pp. 527-536, vol. 44, No. 3, Aug. 1998.

Lee, Dong-Ho et al., "HDTV Video Decoder Which Can Be Implemented With Low Complexity," IEEE International Conference on Consumer Electronics, pp. 6-7, 1994.

Sun, Huifang, "Hierarchical Decoder for MPEG Compressed Video Data," IEEE Transactions for Consumer Electronics, pp. 559-564, vol. 39, No. 3, Aug. 1993.

Yu, Haoping et al., "Block-Based Image Processor for Memory Efficient MPEG Video Decoding," 1999 IEEE International Conference on Consumer Electronics, pp. 114-115, 1999.

"Data Flow Processor for Multi-Standard Video Codec", Custom Integrated Circuits Conference, 1994, Proceedings of the IEEE 1994 San Diego, CA, USA, May 1-4, 1994, pp. 103-106, XP010129914, ISBN: 0-7803-1886-2.

* cited by examiner

| Addr # ⌐800 | CCL ⌐810 | NSL ⌐820 | EOB ⌐830 | Status ⌐840 | INFO/OFFSET ⌐850 |
|---|---|---|---|---|---|
| 0 | 3 | 3 | 0 | 0101 | 8 (offset) |
| 1 | 0 | 0 | 0 | 0111 (error) | .... |
| 2 | 3 | - | 0 | 0100 (found) | B |
| 3 | 3 | - | 0 | 0100 (found) | C |
| 4 | 1 | - | 0 | 0100 (found) | A |
| 5 | 1 | - | 0 | 0100 (found) | A |
| 6 | 1 | - | 0 | 0100 (found) | A |
| 7 | 1 | - | 0 | 0100 (found) | A |
| .... | | | | | |
| 12 | 2 | - | 0 | 0100 (found) | X |
| 13 | 2 | - | 0 | 0100 (found) | X |
| 14 | 3 | - | 0 | 0100 (found) | Y |
| 15 | 3 | - | 0 | 0100 (found) | Z |

FIG.8

| Functional Block | Stage x /−1206<br>← MB time → | Stage x+1 /−1208<br>← MB time → | Stage x+2 /−1210<br>← MB time → |
|---|---|---|---|
| Decoder Processor 1200 | MB (row$_0$, col$_0$) header decoding (eg: MBA, MQ, MVs, CBP...) | MB (row$_1$, col$_0$) header decoding (eg: MBA, MQ, MVs, CBP...) | MB (row$_0$, col$_1$) header decoding (eg: MBA, MQ, MVs, CBP...) |
| VLD0 1202 | Assist decoder processor with MB (row$_0$,col$_0$) header decoding | Perform MB (row$_0$,col$_0$) coefs decoding | Assist decoder processor with MB (row$_0$,col$_1$) header decoding |
| VLD1 1204 |  | Assist decoder processor with MB (row1,col$_0$) header decoding | Perform MB (row$_1$,col$_0$) coefs decoding |

FIG.12

| | | Stage 1 | Stage 2 | Stage 3 | Stage 4 | Stage 5 | Stage 6 | Stage 7 | Stage 8 |
|---|---|---|---|---|---|---|---|---|---|
| 1300 | Core Proc. | (0,0) | (1,0) | (0,1) | (1,1) | (0,2) | (1,2) | (0,3) | (1,3) |
| 1302 | VLD0 | (0,0) | (0,0) | (0,1) | (0,1) | (0,2) | (0,2) | (0,3) | (0,3) |
| 1304 | VLD1 | | (1,0) | (1,0) | (1,1) | (1,1) | (1,2) | (1,2) | (1,3) |
| 1306 | IQ | | | (0,0) | (1,0) | (0,1) | (1,1) | (0,2) | (1,2) |
| 1308 | IDCT | | | | (0,0) | (1,0) | (0,1) | (0,2) | (0,2) |
| 1310 | PF_REF | | | (0,0) | (1,0) | (0,1) | (1,1) | (0,1) | (1,2) |
| 1312 | PF_REC | | | | (0,0) | (1,0) | (0,1) | (1,1) | (0,2) |
| 1314 | MC | | | | | (0,0) | (1,0) | (0,1) | (1,1) |
| 1316 | DMA | | | | | | (0,0) | (1,0) | (0,1) |

FIG.13

VIDEO DECODING SYSTEM HAVING A PROGRAMMABLE VARIABLE-LENGTH DECODER

PRIORITY CLAIM TO RELATED APPLICATIONS

This application is a continuation-in-part of U.S. patent application Ser. No. 09/640,870, filed Aug. 18, 2000, now U.S. Pat. No. 6,768,774 and entitled "Video and Graphics System with Video Scaling," which is a continuation-in-part of U.S. patent application Ser. No. 09/437,208, filed Nov. 9, 1999, now U.S. Pat. No. 6,570,579 and entitled "Graphics Display System." patent application Ser. No. 09/640,870 claims the benefit of the filing date of U.S. provisional patent application No. 60/170,866, filed Dec. 14, 1999, and entitled "Graphics Chip Architecture." This application also claims priority to U.S. provisional patent application No. 60/369,144, and entitled "Video Decoding System Having a Programmable Variable Length Decoder," filed Apr. 1, 2002. The contents of each of the above-referenced applications are hereby incorporated by reference.

INCORPORATION BY REFERENCE OF RELATED APPLICATIONS

The following U.S. patent applications are related to the present application and are hereby specifically incorporated by reference: patent application Ser. No. 10/114,798, entitled "VIDEO DECODING SYSTEM SUPPORTING MULTIPLE STANDARDS"; patent application Ser. No. 10/114,679, entitled "METHOD OF OPERATING A VIDEO DECODING SYSTEM"; patent application Ser. No. 10/114,797, entitled "METHOD OF COMMUNICATING BETWEEN MODULES IN A DECODING SYSTEM"; patent application Ser. No. 10/114,886, entitled "MEMORY SYSTEM FOR VIDEO DECODING SYSTEM"; patent application Ser. No. 10/114,619, entitled "INVERSE DISCRETE COSINE TRANSFORM SUPPORTING MULTIPLE DECODING PROCESSES"; and patent application Ser. No. 10/113,094, entitled "RISC PROCESSOR SUPPORTING ONE OR MORE UNINTERRUPTIBLE CO-PROCESSORS"; all filed on Apr. 1, 2002; patent application Ser. No. 10/293,633, entitled "PROGRAMMABLE VARIABLE LENGTH DECODER", filed on Nov. 12, 2002; and patent application Ser. No. 10/404,074, entitled "MEMORY ACCESS ENGINE HAVING MULTI-LEVEL COMMAND STRUCTURE" and patent application Ser. No. 10/404,389, entitled "INVERSE QUANTIZER SUPPORTING MULTIPLE DECODING PROCESSES"; both filed on Apr. 1, 2003.

FIELD OF THE INVENTION

The present invention relates generally to video decoding systems, and, more particularly, to variable-length decoding.

BACKGROUND OF THE INVENTION

Digital video decoders decode compressed digital data that represent video images in order to reconstruct the video images. Most transmitted video data is compressed and decompressed using, among other techniques, variable-length coding, such as Huffman coding. Huffman coding is a widely used technique for lossless data compression that achieves compact data representation by taking advantage of the statistical characteristics of the source. The Huffman code is a prefix-free variable-length code that assures that a code is uniquely decodable. In Huffman code, no codeword is the prefix of any other codeword. In some video compression formats, run-length processed data are often subsequently coded by variable-length coding for further data compression.

Variable-length encoding following the Huffman coding principle allocates codes of different lengths to different input data according to the probability of occurrence of the input data, so that statistically more frequent input codes are allocated shorter codes than the less frequent codes. The less frequent input codes are allocated longer codes. The allocation of codes may be done either statically or adaptively. For the static case, the same output code is provided for a given input datum, no matter what block of data is being processed. For the adaptive case, output codes are assigned to input data based on a statistical analysis of a particular input block or set of blocks of data, and possibly changes from block to block (or from a set of blocks to a set of blocks).

A relatively wide variety of encoding/decoding algorithms and encoding/decoding standards presently exists, and many additional algorithms and standards are sure to be developed in the future. The various algorithms and standards produce compressed video bitstreams of a variety of formats. Some existing public format standards include MPEG-1, MPEG-2 (used for standard definition, or SD, and high definition, or HD), MPEG-4, H.263, H.263+ and MPEG-4 AVC, also called H.264. Also, private standards have been developed by Microsoft Corporation (Windows Media), RealNetworks, Inc., Apple Computer, Inc. (QuickTime), and others. The combination of run-length coding and Huffman coding has been adopted in most compression/decompression standards. However, every standard has its own variable length code tables and run-length definitions. It would be desirable to have a multi-format decoding system that can decode a variety of variable-length encoded bitstream formats, including existing and future standards, and to do so in a cost-effective manner.

A highly optimized hardware architecture can be created to address a specific video decoding standard, but this kind of solution is typically limited to a single format. On the other hand, a fully software based solution is capable of handling any encoding format, but at the expense of performance. Currently, the latter case is solved in the industry by the use of general-purpose processors running on personal computers. Sometimes the general-purpose processor is accompanied by digital signal processor (DSP) oriented acceleration modules, like multiply-accumulate (MAC), that are intimately tied to the particular internal processor architecture. For example, in one existing implementation, an Intel Pentium processor is used in conjunction with an MMX acceleration module. Such a solution is limited in performance and does not lend itself to creating mass market, commercially attractive systems.

Others in the industry have addressed the problem of accommodating different encoding/decoding algorithms by designing special purpose DSPs in a variety of architectures. Some companies have implemented Very Long Instruction Word (VLIW) architectures more suitable to video processing and able to process several instructions in parallel. In these cases, the processors are difficult to program when compared to a general-purpose processor, and VLIW processors tend to have difficulty decoding variable length codes since the nature of the codes does not lend itself to parallel operations. In special cases, where the processors are dedicated for decoding compressed video, special processing accelerators are tightly coupled to the instruction pipeline and are part of the core of the main processor.

Yet others in the industry have addressed the problem of accommodating different encoding/decoding algorithms by simply providing multiple instances of hardware dedicated to a single algorithm. This solution is inefficient and is not cost-effective, and it not practical for all compressed video formats. Thus there is a need for a simple and flexible decoding system that can speedily and efficiently decode variable-length codes of varying standards.

Further limitations and disadvantages of conventional and traditional approaches will become apparent to one of skill in the art through comparison of such systems with the present invention as set forth in the remainder of the present application with reference to the drawings.

SUMMARY OF THE INVENTION

One aspect of the present invention is directed to a video decoding system comprising a decoder processor, a first variable-length decoding accelerator and a second variable-length decoding accelerator. The decoder processor is adapted to perform decoding functions on a video data stream. The first and second variable-length decoding accelerators are each coupled to the decoder processor and are adapted to perform variable-length decoding operations on variable-length code in the video data stream.

Another aspect of the present invention is directed to a variable-length decoder having a plurality of code tables and a code table selection register. The code tables are stored in memory. Each code table corresponds to either a different class of variable length codes in a decoding method or to a different decoding method. Each of the code tables matches variable-length codes to their corresponding decoded information. The code table selection register holds a value that dictates which of the plurality of code tables is to be utilized to decode variable-length code. The register is programmable to dictate the appropriate code table to be employed according to the format of an incoming data stream.

Another aspect of the present invention is directed to a video decoding system having a decoder processor and a variable-length decoding accelerator. The decoder processor performs decoding functions on a video data stream. The variable-length decoding accelerator is coupled to the decoder processor and performs variable-length decoding operations on variable-length codes in the video data stream. The variable-length decoding accelerator is capable of decoding variable-length codes according to any of a plurality of decoding methods.

It is understood that other embodiments of the present invention will become readily apparent to those skilled in the art from the following detailed description, wherein embodiments of the invention are shown and described only by way of illustration of the best modes contemplated for carrying out the invention. As will be realized, the invention is capable of other and different embodiments and its several details are capable of modification in various other respects, all without departing from the spirit and scope of the present invention. Accordingly, the drawings and detailed description are to be regarded as illustrative in nature and not as restrictive.

DESCRIPTION OF THE DRAWINGS

These and other features, aspects, and advantages of the present invention will become better understood with regard to the following description, appended claims, and accompanying drawings where:

FIG. 8 is an example of a code table according to the code table storage algorithm of the present invention.

FIG. 12 is a chart representing a decoding pipeline according to an illustrative embodiment of the present invention.

FIG. 13 is a chart representing a dual-row decoding pipeline employing cycle stealing according to an illustrative embodiment of the present invention.

DETAILED DESCRIPTION

Figure 1:
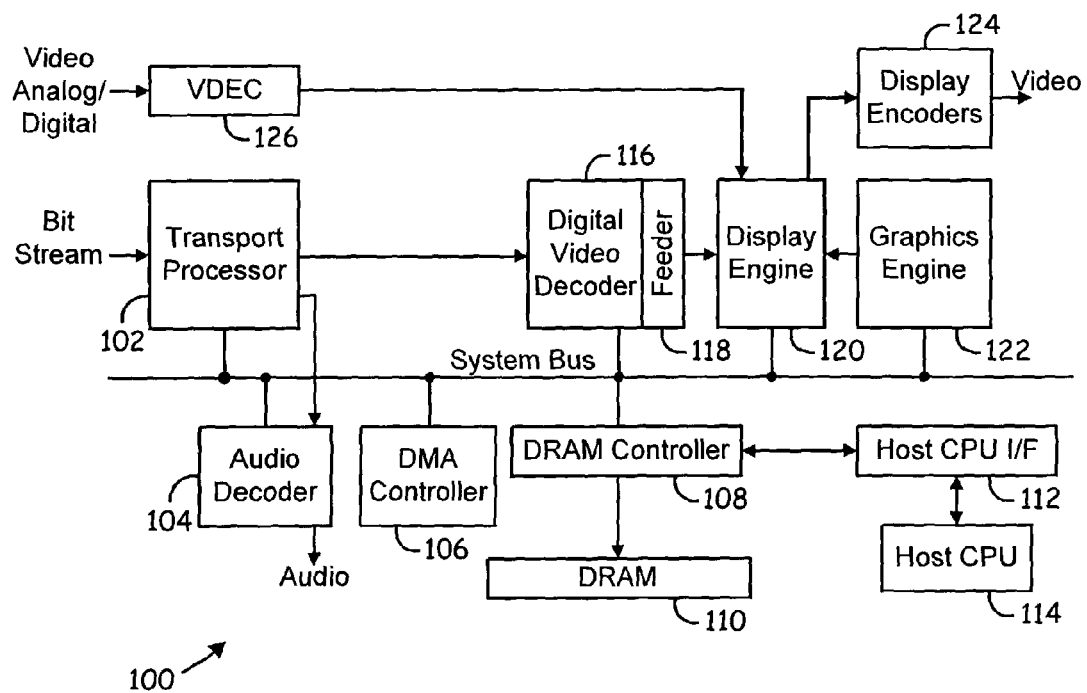
FIG. 1 is a functional block diagram of a digital media system in which the present invention may be illustratively employed.

The present invention forms an integral part of a complete digital media system and provides flexible decoding resources. FIG. 1 is a functional block diagram of a digital media system in which the present invention may be illustratively employed. It will be noted, however, that the present invention can be employed in systems of widely varying architectures and widely varying designs.

The digital media system of FIG. 1 includes transport processor 102, audio decoder 104, direct memory access (DMA) controller 106, system memory controller 108, system memory 110, host CPU interface 112, host CPU 114, digital video decoder 116, display feeder 118, display engine 120, graphics engine 122, display encoders 124 and analog video decoder 126. The transport processor 102 receives and processes a digital media data stream. The transport processor 102 provides the audio portion of the data stream to the audio decoder 104 and provides the video portion of the data stream to the digital video decoder 116. In one embodiment, the audio and video data is stored in main memory 110 prior to being provided to the audio decoder 104 and the digital video decoder 116. The audio decoder 104 receives the audio data stream and produces a decoded audio signal. DMA controller 106 controls data transfer amongst main memory 110 and memory units contained in elements such as the audio decoder 104 and the digital video decoder 116. The system memory controller 108 controls data transfer to and from system memory 110. In an illustrative embodiment, system memory 110 is a dynamic random access memory (DRAM) unit. The digital video decoder 116 receives the video data stream, decodes the video data and provides the decoded data to the display engine 120 via the display feeder 118. The analog video decoder 126 digitizes and decodes an analog video signal (e.g. NTSC or PAL) and provides the decoded data to the display engine 120. The graphics engine 122 processes graphics data in the data stream and provides the processed graphics data to the display engine 120. The display engine 120 prepares decoded video and graphics data for display and provides the data to display encoders 124, which provide an encoded video signal to a display device.

Figure 2:
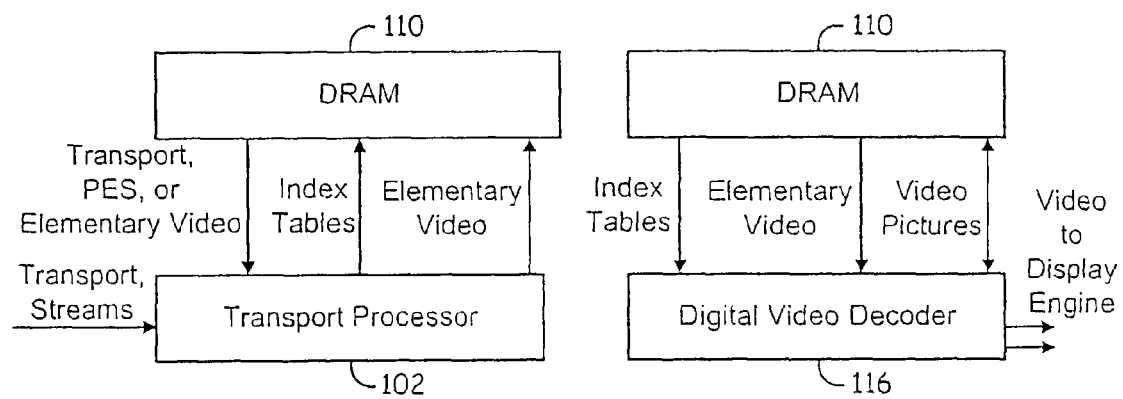
FIG. 2 is a functional block diagram demonstrating a video decode data flow according to an illustrative embodiment of the present invention.

FIG. 2 is a functional block diagram demonstrating a video decode data flow according to an illustrative embodiment of the present invention. Transport streams are parsed by the transport processor 102 and written to main memory 110 along with access index tables. The video decoder 116 retrieves the compressed video data for decoding, and the resulting decoded frames are written back to main memory 110. Decoded frames are accessed by the display feeder interface 118 of the video decoder for proper display by a display unit. In FIG. 2, two video streams are shown flowing to the display engine 120, suggesting that, in an illustrative embodiment, the architecture allows multiple display streams by means of multiple display feeders.

Aspects of the present invention relate to the architecture of digital video decoder 116. In accordance with an exemplary embodiment of the present invention, a moderately capable general purpose CPU with widely available development tools is used to decode a variety of coded streams using hardware accelerators designed as integral parts of the decoding process.

Figure 3:
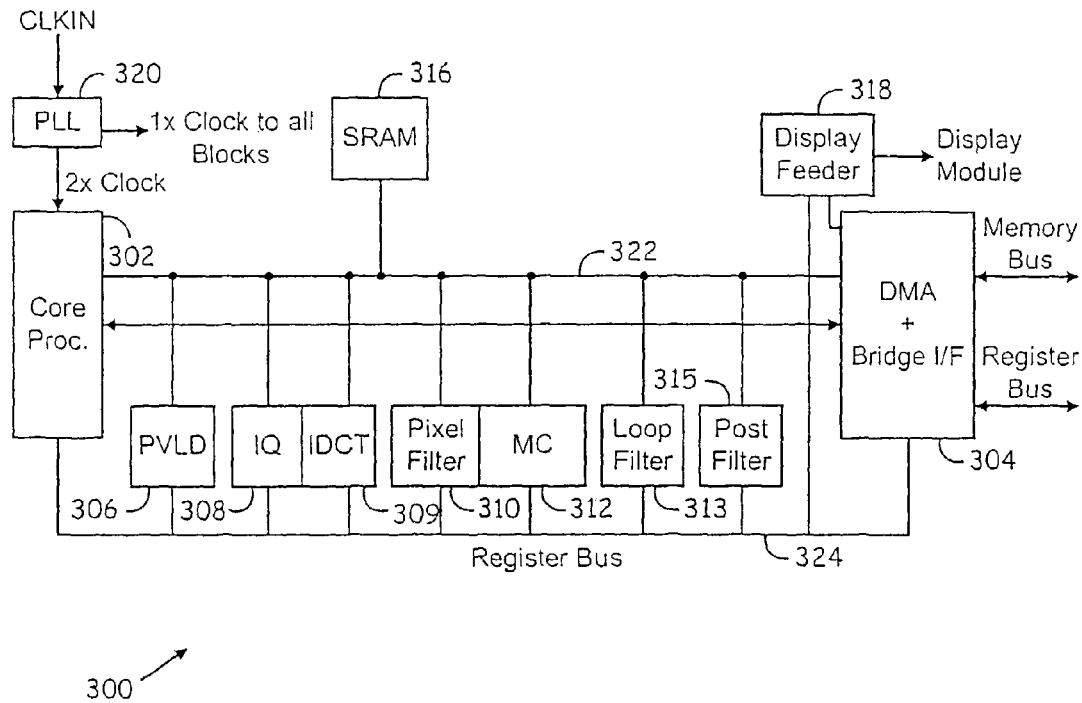
FIG. 3 is a functional block diagram of a decoding system according to an illustrative embodiment of the present invention.

FIG. 3 is a functional block diagram of a digital video decoding system 300 according to an illustrative embodiment of the present invention. The digital video decoding system 300 of FIG. 3 can illustratively be employed to implement the digital video decoder 116 of FIGS. 1 and 2. Video decoding system 300 includes core decoder processor 302, DMA Bridge 304, decoder memory 316, display feeder 318, phase-locked loop element 320, and acceleration modules 306, 308, 309, 310, 312, 313 and 315. The acceleration modules include variable-length decoder (VLD) 306, inverse quantization (IQ) module 308, inverse discrete cosine transform (IDCT) module 309, pixel filter 310, motion compensation module 312, loop filter 313 and post filter 315. The acceleration modules 306, 308, 309, 310 and 312 are hardware accelerators that accelerate special decoding tasks that would otherwise be bottlenecks for real-time video decoding if these tasks were handled by the core processor 302, alone. This helps the core processor achieve the required performance.

The core processor 302 is the central control unit of the decoding system 300. The core processor 302 prepares the data for decoding. The core processor 302 also orchestrates the macroblock (MB) processing pipeline for the acceleration modules and fetches the required data from main memory 110 via the DMA bridge 304. The core processor 302 also handles some data processing tasks. Picture level processing, including sequence headers, GOP headers, picture headers, time stamps, macroblock-level information, except the block coefficients, and buffer management, are performed directly and sequentially by the core processor 302, without using the accelerators 304, 306, 308, 309, 310, 312, 313 and 315, other than the VLD 306 (which accelerates general bitstream parsing). Picture level processing does not generally overlap with slice level/macroblock decoding. In an illustrative embodiment of the present invention, the core processor 302 is a MIPS processor, such as a MIPS32 implementation, for example.

The most widely-used compressed video formats fall into a general class of DCT-based, variable-length coded, block-motion-compensated compression algorithms. As mentioned above, these types of algorithms encompass a wide class of international, public and private standards, including MPEG-1, MPEG-2 (SD/HD), MPEG-4, H.263, H.263+, H.264, MPEG-4 AVC, Microsoft Corp., Real Networks, QuickTime, and others. Each of these algorithms implements some or all of the functions implemented by variable-length decoder 306, and the other hardware accelerators 308, 309, 310 312, 313 and 315, in different ways that prevent fixed hardware implementations from addressing all requirements without duplication of resources. In accordance with one aspect of the present invention, variable-length decoder 306 and the other hardware accelerators 308, 309, 310, 312, 313 and 315, are internally programmable to allow changes according to various processing algorithms. This enables a decoding system that decodes most standards efficiently and flexibly.

The decoding system of the present invention employs high-level granularity acceleration with internal programmability to achieve the requirements above by implementation of very fundamental processing structures that can be configured dynamically by the core decoder processor. This contrasts with a system employing fine-granularity acceleration, such as multiply-accumulate (MAC), adders, multipliers, FFT functions, DCT functions, etc. In a fine-granularity acceleration system, the decompression algorithm has to be implemented with firmware that uses individual low-level instructions (like MAC) to implement a high-level function, and each instruction runs on the core processor. In the high-level granularity system of the present invention, the firmware configures, i.e., programs, variable-length decoder 306 and the other hardware accelerators 308, 309, 310, 312, 313 and 315, which in turn represent high-level functions (like variable-length decoding) that run without intervention from the main core processor 302. Therefore, each hardware accelerator 306, 308, 309, 310, 312, 313 and 315, runs in parallel according to a processing pipeline dictated by the firmware in the core processor 302. Upon completion of the high-level functions, each accelerator notifies the main core processor 302, which in turn decides what the next processing pipeline step should be.

In an illustrative embodiment of the present invention, the software control consists of a simple pipeline that orchestrates decoding by issuing commands to each hardware accelerator module for each pipeline stage, and a status request mechanism that makes sure that all modules have completed their pipeline tasks before issuing the start of the next pipeline stage. As used in the present application, the term "stage" can refer to all of the decoding functions performed during a given time slot, or it can refer to a functional step, or group of functional steps, in the decoding process. Each hardware module 306, 308, 309, 310, 312, 313 and 315, performs its task after being so instructed by the core processor 302. In an illustrative embodiment of the present invention, each hardware module includes a status register that indicates whether the module is active or inactive. The core processor 302 polls the status register to determine whether the hardware module has completed its task. In an alternative embodiment, the hardware accelerators share a status register.

Variable-length decoder 306 is a hardware accelerator that accelerates the process of decoding variable-length codes, which might otherwise be a bottleneck for a decoding process if it were handled by the core processor 302 alone. In accordance with the present invention, the VLD 306 can also be any other type of entropy decoder. But for purposes of explanation, the present invention will be described with respect to a variable-length decoder. The VLD 306 performs decoding of variable length codes (VLC) in the compressed bit stream to extract coefficients, such as DCT coefficients, from the compressed data stream. Different coding formats generally have their own special VLC tables. According to the present invention, the VLD module 306 is internally programmable to allow changes according to various processing algorithms. The VLD 306 is completely configurable in terms of the VLC tables it can process. The VLD 306 can accommodate different VLC tables, selectable as needed under the control of the core processor 302. In an illustrative embodiment of the present invention, the VLD 306 includes a register that the core processor can program to guide the VLD 306 to use the appropriate VLC table according to the needs of the encoding/decoding algorithm and the class of codes expected.

The VLD 306 is designed to support the worst-case requirement for VLD operation, such as with MPEG-2 HDTV (Main Profile at High Level) for video decoding, while retaining its full programmability. The VLD 306 includes a code table random access memory (RAM) for fastest performance. Some compression/decompression formats, such as Windows Media Technology 8 (WMT8) video, may require larger code tables that do not fit entirely within the code RAM in the VLD 306. For such cases, according to an illustrative embodiment of the present invention, the VLD 306 can make use of both the decoder memory 316 and the main memory 110 as needed. Performance of VLC decoding is reduced somewhat when codes are searched in video memory 316 and main memory 110. Therefore, for formats that require large amounts of code, the most common codes are stored in the VLD code RAM, the next most common codes are stored in decoder memory 316, and the least common codes are stored in main memory 110. Also, such codes are stored in decoder memory 316 and main memory 110 such that even when extended look-ups in decoder memory 316 and main memory 110 are required, the most commonly occurring codes are found more quickly. This allows the overall performance to remain exceptionally high. The VLD 306 decodes variable length codes in as little as one clock, depending on the specific code table in use and the specific code being decoded.

In an illustrative embodiment of the present invention, the VLD 306 helps the core processor 104 to decode header information in the compressed bitstream. In an illustrative embodiment of the present invention, the VLD module 306 is architected as a coprocessor to the decoder processor 110. That is, it can operate on a single-command basis where the core processor issues a command (via a coprocessor instruction) and waits (via a Move From Coprocessor instruction) until it is executed by the VLD 306, without polling to determine completion of the command. This increases performance when a large number of VLC codes that are not DCT coefficients are parsed.

In an alternative embodiment, the VLD 306 is architected as a hardware accelerator. In this embodiment, the VLD 306 can perform complex tasks such as decoding a set of VLC codes, and it includes a status register that indicates whether the module is active or inactive. The core processor 302 polls the status register to determine whether the VLD 306 has completed its tasks. In an alternative embodiment, the VLD 306 shares a status register with other decoding elements, such as decoding elements 308, 309, 310 and 312.

In an illustrative embodiment of the present invention, the VLD module 306 includes two variable-length decoders. Each of the two variable-length decoders can be hardwired to efficiently perform decoding according to a particular compression standard, such as MPEG-2 HD. In an illustrative embodiment, one or both of two VLDs can be optionally set as a programmable VLD engine, with a code RAM to hold VLC tables for other media coding formats. The two VLD engines are controlled independently by the core processor 302, and either one or both of them will be employed at any given time, depending on the application.

The VLD 306 can operate on a block-command basis where the core processor 302 commands the VLD 306 to decode a complete block of VLC codes, such as DCT coefficients, and the core processor 302 continues to perform other tasks in parallel. In this case, the core processor 302 verifies the completion of the block operation by checking a status bit in the VLD 306. The VLD 306 produces results (tokens) that are stored in decoder memory 316.

The VLD 306 checks for invalid codes and recovers gracefully from them. Invalid codes may occur in the coded bit stream for a variety of reasons, including errors in the video encoding, errors in transmission, and discontinuities in the stream.

The inverse quantizer module 308 performs run-level code (RLC) decoding, inverse scanning (also called zig-zag scanning), inverse quantization and mismatch control. The coefficients, such as DCT coefficients, extracted by the VLD 306 are processed by the inverse quantizer 308 to bring the coefficients from the quantized domain to the DCT domain. In an exemplary embodiment of the present invention, the IQ module 308 obtains its input data (run-level values) from the decoder memory 316, as the result of the VLD module 306 decoding operation. In an alternative embodiment, the IQ module 308 obtains its input data directly from the VLD 306. This alternative embodiment is illustratively employed in conjunction with encoding/decoding algorithms that are relatively more involved, such as MPEG-2 HD decoding, for best performance. The run-length, value and end-of-block codes read by the IQ module 308 are compatible with the format created by the VLD module when it decodes blocks of coefficient VLCs, and this format is not dependent on the specific video coding format being decoded.

The IDCT module 309 performs the inverse transform to convert the coefficients produced by the IQ module 308 from the frequency domain to the spatial domain. The primary transform supported is the discrete cosine transform (DCT) as specified in MPEG-2, MPEG-4, IEEE, and several other standards. The IDCT module 309 also supports alternative related transforms, such as the "linear" transform in H.264 and MPEG-4 AVC, which is not quite the same as IDCT.

In an illustrative embodiment of the present invention, the coefficient input to the IDCT module 309 is read from decoder memory 316, where it was placed after inverse quantization by the IQ module 308. The transform result is written back to decoder memory 316. In an exemplary embodiment, the IDCT module uses the same memory location in decoder memory 316 for both its input and output, allowing a savings in on-chip memory usage. In an alternative embodiment, the coefficients produced by the IQ module are provided directly to the IDCT module 309, without first depositing them in decoder memory 316. To accommodate this direct transfer of coefficients, in one embodiment of the present invention, the IQ module 308 and IDCT module 309 are part of the same hardware module and use a common interface to the core processor. In an exemplary embodiment, the transfer of coefficients from the IQ module 308 to the IDCT module 309 can be either direct or via decoder memory 316. For encoding/decoding algorithms that are relatively more involved, such as MPEG-2 HD decoding, the transfer is direct in order to save time and improve performance.

The pixel filter 310 performs pixel filtering and interpolation as part of the motion compensation process. Motion compensation is performed when an image from a region of a previous frame is similar to a region in the present frame, just at a different location within the frame. Rather than recreate the image anew from scratch, the previous image is used and just moved to the proper location within the frame. For example, assume the image of a person's eye is contained in a macroblock of data at frame #0. Say that the person moved to the right so that at frame #1 the same eye is located in a different location in the frame. Motion compensation uses the eye from frame #0 (the reference frame) and simply moves it to the new location in order to get the new image. The new location is indicated by motion vectors that denote the spatial displacement in frame #1 with respect to reference frame #0.

The pixel filter 310 performs the interpolation necessary when a reference block is translated (motion-compensated) into a position that does not land on whole-pixel locations. For example, a hypothetical motion vector may indicate to move a particular block 10.5 pixels to the right and 20.25 pixels down for the motion-compensated prediction. In an illustrative embodiment of the present invention, the motion vectors are decoded by the VLD 306 in a previous processing pipeline stage and are stored in the core processor 302. Thus, the pixel filter 310 gets the motion information as vectors and not just bits from the bitstream during decoding of the "current" macroblock in the "current" pipeline stage. The reference block data for a given macroblock is stored in memory after decoding of said macroblock is complete. In an illustrative embodiment, the reference picture data is stored in system memory 110. If and when that reference macroblock data is needed for motion compensation of another macroblock, the pixel filter 310 retrieves the reference macroblock pixel information from system memory 110 and the motion vector from the core processor 302 and performs pixel filtering. The pixel filter stores the filtered result (pixel prediction data) in decoder memory 316.

The motion compensation module 312 reconstructs the macroblock being decoded by performing the addition of the decoded difference (or "error") pixel information from the IDCT 309 to the pixel prediction data from the output of the pixel filter 310. The pixel filter 310 and motion compensation module 312 are shown as one module in FIG. 3 to emphasize a certain degree of direct cooperation between them.

The loop filter 313 and post filter 315 perform de-blocking filter operations. Some decoding algorithms employ a loop filter and others employ a post filter. The difference is where in the processing pipeline each filter 313, 315 does its work. The loop filter 313 processes data within the reconstruction loop and the results of the filter are used in the actual reconstruction of the data. The post filter 315 processes data that has already been reconstructed and is fully decoded in the two-dimensional picture domain. In an illustrative embodiment of the present invention, the loop filter 313 and post filter 315 are combined in one filter module.

In an illustrative embodiment the input data to the loop filter 313 and post filter 315 comes from decoder memory 316. This data includes pixel and block/macroblock parameter data generated by other modules in the decoding system 300. In an illustrative embodiment of the present invention, the loop filter 313 and post filter 315 have no direct interfaces to other processing modules in the decoding system 300. The output data from the loop filter 313 and post filter 315 is written into decoder memory 316. The core processor 302 then causes the processed data to be put in its correct location in main memory.

At the macroblock level, the core processor 302 interprets the decoded bits for the appropriate headers and decides and coordinates the actions of the hardware blocks 306, 308, 309, 310, 312, 313 and 315. Specifically, all macroblock header information, from the macroblock address increment (MBAinc) to motion vectors (MVs) and to the cbp pattern, in the case of MPEG-2 decoding, for example, is derived by the core processor 302. The core processor 302 stores related information in a particular format or data structure (determined by the hardware module specifications) in the appropriate buffers in the decoder memory 316. For example, the quantization scale is passed to the buffer for the IQ engine 308; macroblock type, motion type and pixel precision are stored in the parameter buffer for the pixel filter engine 310. The core processor keeps track of certain information in order to maintain the correct pipeline. For example, motion vectors of the macroblock are kept as the predictors for future motion vector derivation.

Decoder memory 316 is used to store macroblock data and other time-critical data used during the decode process. Each hardware block 306, 308, 309, 310, 312, 314 accesses decoder memory 316 to either read the data to be processed or write processed data back. In an illustrative embodiment of the present invention, all currently used data is stored in decoder memory 316 to minimize access to main memory. Each hardware module 306, 308, 309, 310, 312, 314 is assigned one or more buffers in decoder memory 316 for data processing. Each module accesses the data in decoder memory 316 as the macroblocks are processed through the system. In an exemplary embodiment, decoder memory 316 also includes parameter buffers that are adapted to hold parameters that are needed by the hardware modules to do their job at a later macroblock pipeline stage. The buffer addresses are passed to the hardware modules by the core processor 302. In an illustrative embodiment, decoder memory 316 is a static random access memory (SRAM) unit.

The core processor 302, DMA Bridge 304, VLD 306, IQ 308, IDCT 309, pixel filter 310, motion compensation module 312, loop filter 313 and post filter 315 have access to decoder memory 316 via the internal bus 322. The VLD 306, IQ 308, IDCT 309, pixel filter 310, motion compensation module 312, loop filter 313 and post filter 315 use the decoder memory 316 as the source and destination memory for their normal operation. The CPU 114 has access to decoder memory 316, and the DMA engine 304 can transfer data between decoder memory 316 and the main system memory (DRAM) 110. The arbiter for decoder memory 316 is in the bridge module 304.

The bridge module 304 arbitrates and moves picture data between decoder memory 316 and main memory. The bridge interface 304 includes an internal bus network that includes arbiters and a direct memory access (DMA) engine. The DMA bridge 304 serves as an asynchronous interface to the system buses.

The display feeder module 318 reads decoded frames from main memory and manages the horizontal scaling and displaying of picture data. The display feeder 318 interfaces directly to a display module. In an illustrative embodiment, the display feeder 318 includes multiple feeder interfaces, each including its own independent color space converter and scaler. The display feeder 318 handles its own memory requests via the bridge module 304.

In an illustrative embodiment of the present invention, the core processor 302 runs at twice the frequency of the other processing modules 306, 308, 309, 310, 312, 313, 315. An elegant, flexible and efficient clock strategy is achieved by generating two internal clocks in an exact 2:1 relationship to each other. The system clock signal CLKIN is used as input to the phase-locked loop element (PLL) 320, which is a closed-loop feedback control system that locks to a particular phase of the system clock to produce a stable signal with little jitter. The PLL element 320 generates a 1× clock for the hardware accelerators, DMA bridge 304 and the core processor bus interface, while generating a 2× clock for the core processor 302 and the core processor bus interface. This is to allow the core processor 302 to operate at high clock frequencies if it is designed to do so, and to allow other logic to operate at the slower 1× clock frequency. It also allows the decoding system 300 to run faster than the nominal clock frequency if the circuit timing supports it.

Figure 4:
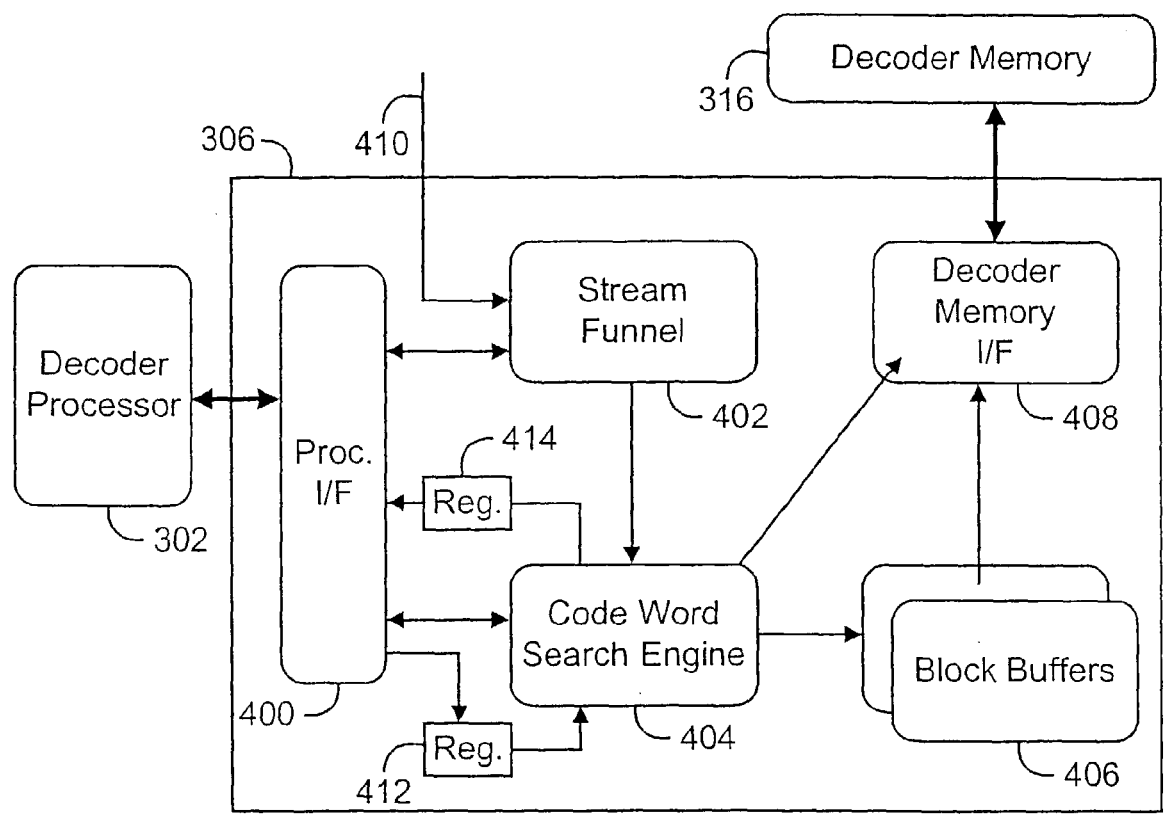
FIG. 4 is a functional block diagram representing a variable-length decoding system according to an illustrative embodiment of the present invention.

FIG. 4 is a functional block diagram representing a variable-length decoding system according to an illustrative embodiment of the present invention. In FIG. 4, elements that are also shown in FIG. 3 are given like reference numbers. The VLD 306 includes decoder processor interface 400, stream funnel 402, codeword search engine 404, block buffer 406, decoder memory interface 408, code table selection register 412 and status register 414.

The input 410 to the VLD 306 is a bit stream without explicit word boundaries. The VLD 306 decodes a codeword, determines its length, and shifts the input data stream by the number of bits corresponding to the decoded code length, before decoding the next codeword. These are recursive operations that are not pipelined.

The VLD 306 is implemented based on a small, local, code table memory unit, located in codeword search engine 404, that stores programmable variable length code tables. In an illustrative embodiment, the local memory unit is a random access memory (RAM) unit. A small code table memory unit is achieved by employing a multistage search structure that reduces the storage requirement, enables fast bit extraction and efficiently handles the case of a large number of code tables.

The stream funnel 402 receives data from the source (or coded data buffer) and shifts the data according to the previously decoded code length, so as to output the correct window of bits for the symbols that are being currently decoded. In an illustrative embodiment, the stream funnel receives the incoming bitstream 410 from system memory 110.

The codeword search engine 404 mainly behaves as a symbol search engine. The codeword search engine is based on a multistage search structure. Since codewords are usually assigned based on the probability of appearance, the shortest codeword is generally assigned to the most frequent appearance. The multistage search structure is based on this concept. The codeword search engine 404 incorporates a small code memory that is employed for performing pattern matching. A multistage, pipelined structure is employed to handle the case of a long codeword. Additionally, a code table reduction algorithm can further reduce the storage requirement for a large number of code tables.

Status register 414 is adapted to hold an indicator of the status of the VLD 306. The status register is accessible by the core decoder processor 302 to determine the status of VLD 306. In an illustrative embodiment, the status register 414 indicates whether or not the VLD has completed its variable-length decoding functions on the current macroblock. In an alternative embodiment of the present invention, the VLD module 306 is architected as a coprocessor to the decoder processor 302. That is, the VLD 306 can operate on a single-command basis where the core processor issues a command (via a coprocessor instruction) and waits (via a Move From Coprocessor instruction) until it is executed by the VLD 306, without polling the status register 414 to determine completion of the command.

Code table selection register 412 is adapted to hold a value that dictates which of a plurality of VLD code tables is to be utilized to decode variable-length code. In an illustrative embodiment, code table selection register 412 holds the starting address of the code table to be employed. The code table selection register 412 is programmable to dictate the appropriate code table to be employed according to the format of an incoming data stream and the class of variable length codes that are expected next. In an illustrative embodiment, the core video processor 302 provides a value (an address, for example) to register 412 to point to the code table that is appropriate for the current data stream and the state of decoding the current stream. The code tables can be switched on a syntax element basis, a macroblock-to-macroblock basis or more or less frequently, as required by the application.

Figure 5:
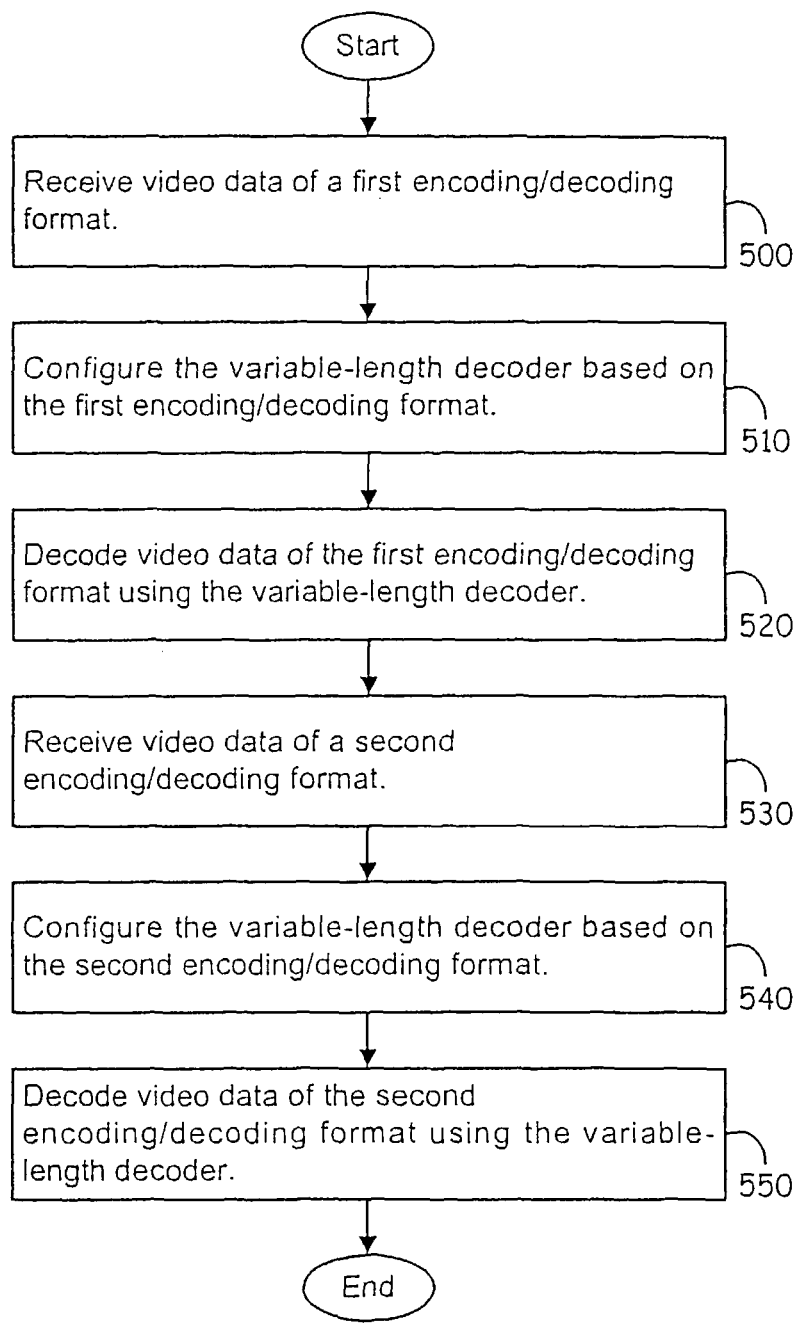
FIG. 5 is a flowchart representing a method of variable-length decoding a digital video data stream according to an illustrative embodiment of the present invention.

FIG. 5 is a flowchart representing a method of variable-length decoding a digital video data stream according to an illustrative embodiment of the present invention. At step 500, video data of a first encoding/decoding format is received. At step 510, variable-length decoder 306 is configured based on the first encoding/decoding format. In an illustrative embodiment, the core video processor 302 configures variable-length decoder 306 by programming code table selection register 412. At step 520, video data of the first encoding/decoding format is decoded by the variable-length decoder 306. At step 530, video data of a second encoding/decoding format is received. At step 540, the variable-length decoder 306 is configured based on the second encoding/decoding format. Then, at step 550, video data of the second encoding/decoding format is decoded using the variable-length decoder 306. As is described above with respect to the individual hardware accelerators of FIGS. 3 and 4, the programming for different decoding formats is done through register bus read and write.

Figure 6:
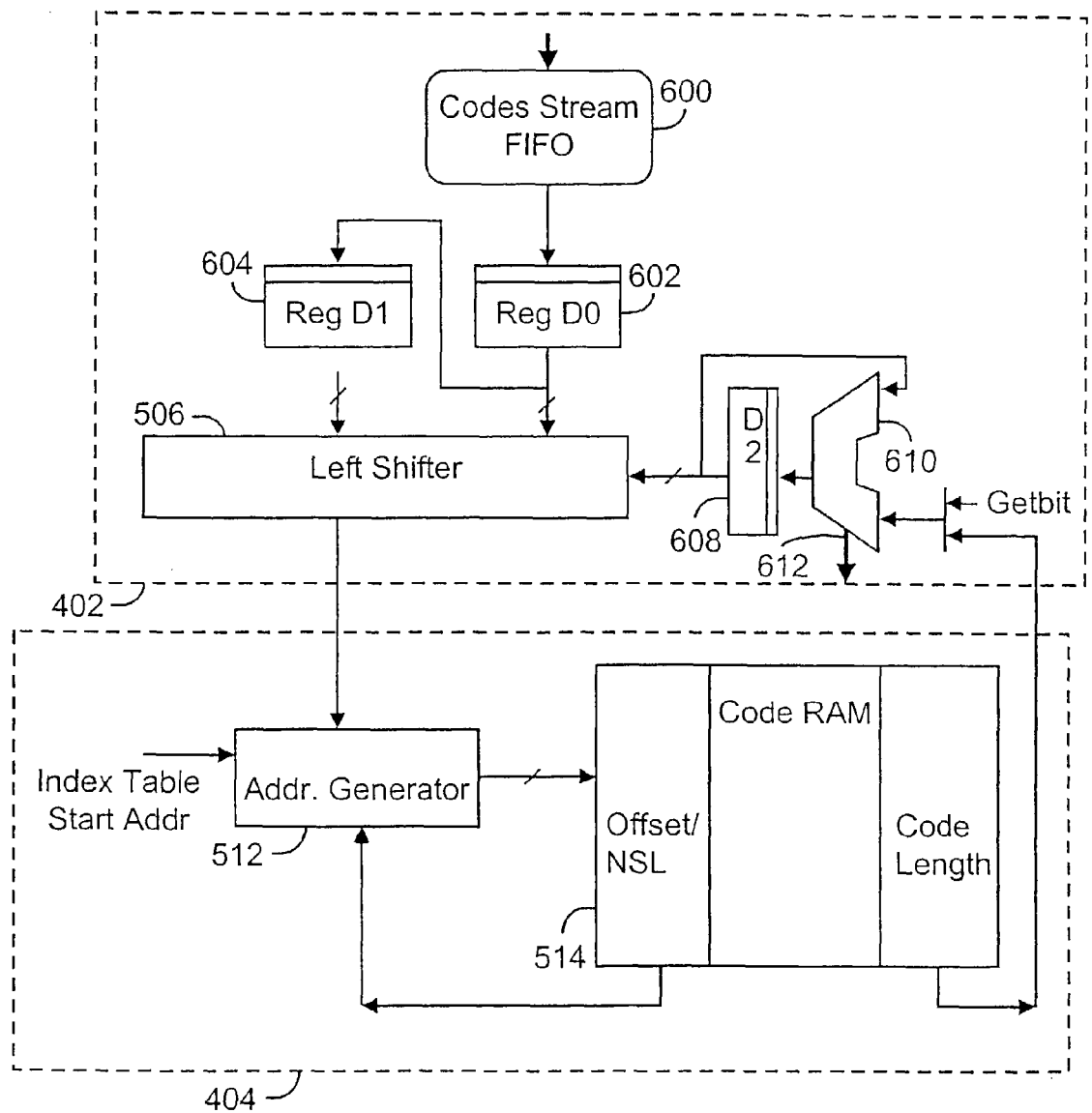
FIG. 6 is a block diagram showing stream funnel and codeword search engine elements of a variable-length decoder according to an illustrative embodiment of the present invention.

FIG. 6 is a block diagram showing the stream funnel 402 and codeword search engine 404 elements of VLD 306, according to an illustrative embodiment of the present invention.

Stream funnel 402 includes data stream input buffer 600, register $D_0$ 602, register $D_1$ 604, left-shifter 606, register $D_2$ 608, and accumulator 610. The input data (coded stream) are stored in input buffer 600, which, in an illustrative embodiment, is a first-in first-out (FIFO) buffer. The input buffer 600 provides the data to register $D_0$ 602. Register $D_1$ 604 also stores part of the incoming bitstream by virtue of load operations that will be discussed below and which load data from register $D_0$ 602 into register $D_1$. The contents of registers $D_0$ and $D_1$ are in turn provided to left shifter 606. In an illustrative embodiment of the present invention, registers $D_0$ and $D_1$ comprise a number of bits equal to the maximum code length. In an embodiment wherein the maximum code length is less than or equal to 32 bits (such as in most video decoding standards), registers $D_0$ 602 and $D_1$ 604 each are 32-bit registers, and left-shifter 606 can hold up to 64 bits. Register $D_2$ 608 indicates the number of bits in register $D_1$ 604 for which the codeword search engine 604 most recently performed a codeword search. If registers $D_0$ and $D_1$ each hold 32 bits, the number of bits indicated by register $D_2$ can lie between 0 and 31. This number controls the left shifter 606. After the codeword search engine 404 performs a codeword search for a group of bits in register $D_1$, register $D_2$ indicates the number of bits just searched. Left shifter 606 then shifts the indicated number of bits to the left so that the first un-searched bit appears at the most significant bit of the output of the left shifter 606.

Accumulator 610 accumulates the number of bits in register $D_1$ 604 that have been searched by codeword search engine 404 over multiple codeword searches. When the accumulated code length (the number of bits that have been searched) is greater than or equal to the size of register $D_1$ 604 (for example, 32 bits), a carry-out bit 612 becomes 1. This indicates that all the bits in register $D_1$ 604 have been used and that register $D_0$ might not contain the whole next codeword. In that case, a "load" signal is generated. When the "load" signal is generated, the contents of register $D_0$ 602 are loaded into register $D_1$ 604, a new data word (32 bits in the illustrative example) from the input buffer 600 is loaded into $D_0$, and the left shifter 606 shifts by the number of bits indicated by register $D_2$ 608 to the new position, all at substantially the same time, to prepare for the next search/decode cycle. If the accumulated code length is not greater than or equal to the size of register $D_1$ 604 (e.g., 32), the carry-out signal 612 is 0. Assuming the maximum code length is 32 bits (the size of registers $D_0$ 602 and $D_1$ 604 in the illustrative embodiment), since at least 32 bits of data in register $D_0$ 602 and $D_1$ 604 are not used yet, there are always enough bits for the next search/decoding cycle. Registers $D_0$ 602 and $D_1$ 604 remained unchanged if the accumulated code length is not greater than or equal to the size of the registers $D_0$ 602 and $D_1$ 604.

When the accumulated code length is greater than or equal to the size of registers $D_0$ and $D_1$, and there is no data available in the input buffer 600, the decoding pipes are put on hold. In other words, the contents of register $D_0$ 602 are not loaded into register $D_1$ 604. The decoding processing then waits until data is available in the input buffer 600.

Codeword search engine 404 includes an address generator 612 and a local memory unit 514. Address generator 612 generates a memory address at which to perform a codeword search. In an illustrative embodiment, this address will reside in the local memory unit 614, but it may also reside in decoder memory 316 or system memory 110, as will be described below. The address generator 612 generates the address to be searched by adding the value of the bits retrieved from left shifter 606, i.e., the data for which a search is to be performed, to a base address. For the first search performed in a given code table, and for subsequent searches when the previous search yielded a code match, the base address is equal to the start address of the code table to be searched. For subsequent searches performed after a previous search did not yield a code match, the base address is equal to the sum of the start address of the code table plus an offset that was indicated by the code table entry of the previous search.

In an illustrative embodiment of the present invention, the starting address of the code table to be searched can be programmed. In this way, the appropriate code table can be selected for the encoding/decoding format and the current state of the bitstream being decoded. In an illustrative embodiment of the present invention, code table selection register 412 holds the starting address of the code table to be searched. This register can be accessed by the decoder processor 302 to point to the code table that is appropriate for the current data stream. The code tables can be switched on a syntax element basis, a macroblock-to-macroblock basis or on other intervals.

Local code table memory 614 holds the code look-up table that is to be used during the variable-length decoding process. The code table that starts at the indicated start address is used in decoding the incoming bitstream. In an illustrative embodiment of the present invention, code table memory 614 is a random access memory (RAM) unit. In a further illustrative embodiment, the code table memory 614 is a relatively small memory unit, for example, a 512×32 single-port RAM.

In an illustrative embodiment of the present invention, if a given code look-up table does not fit within the code table memory unit 614, portions of the table can be stored in decoder memory 316 and/or system memory 110. In an illustrative embodiment, if more memory is needed than the local memory unit 614 alone, first the decoder memory 316 is utilized, and if more still is needed, the system memory 110 is utilized. Where multiple memory units are utilized, the shortest, and therefore most common codes, are stored in local code table memory 614. The next-shortest codes are stored in decoder memory 316, and if needed, the longest codes are stored in system memory 110. This architecture allows for fast bit extraction.

According to an illustrative embodiment of the present invention, the codeword search engine 404 employs a code table storage and look-up method that enables fast bit extraction and also reduces the size of the code tables. Reducing the size of the code tables further reduces the storage requirement for a large number of code tables and results in fast performance for a broad range of codes. One embodiment of the code table storage and look-up method makes use of the multiple memory unit structure mentioned above and uses a multistage, pipelined structure to handle the case of a long codeword.

The code table memory unit 614 supports multiple code tables (up to 32 in an illustrative embodiment). In an illustrative embodiment each code table has the following general information which is pre-programmed by the decoder processor 302: the starting address, in the local memory 614, of the code table during the first search (FSA), the searching length during the first level search (FSL), an indication of whether a sign bit follows the code to be searched, the size of a run code that may follow a specific variable length code (such as an escape code), the size of a level code that may follow a specific variable length code (such as an escape code), and an indication of whether an end of block (EOB) code is to follow the run-level code that may appear. A high sign bit indicator indicates that the code table has a sign bit following the codeword. The size of the run code indicates how many bits are allocated to the run portion of the results. The size of the level code indicates how many bits are allocated to the level portion of the results. The EOB bit indicates whether a "last" bit or EOB bit is expected after the run-level code that may appear. The run-level code and EOB bit may appear following a designated variable length code such as escape (ESC) code. For example, in MPEG4 video, if the escape code is type4, the 15 bits following ESC are decoded as fixed length codes represented by 1-bit Last, 6-bit RUN and 8-bit LEVEL. The meanings of run, level and EOB can vary between different video coding/decoding formats.

Each address of a code table comprises a code table entry. Each entry includes a current code length (CCL) indicator, a next search length (NSL) indicator, an end-of-block (EOB or last code) bit, a status indicator and an information/offset value. The status indicator indicates whether that entry represents a codeword match. If the entry does represent a codeword match, the information/offset value is the matching information, that is, the data that the just-matched codeword represents (the "meaning" of the codeword). If the entry does not represent a codeword match, the information/offset value indicates an address at which to perform the next codeword search. In an illustrative embodiment of the present invention, the offset value indicates an address at which to base the next search to complete decoding of the current codeword. In an alternative embodiment, the offset value is added to another address to obtain the base address from which to perform the next search to complete decoding of the current codeword.

The status indicator can also indicate other aspects of the search status. For example, if the entry does not represent a codeword match, the status indicator indicates the memory unit in which to perform the next codeword search. Also, if the entry represents an error, i.e., no valid code would result in the entry at that memory location to be reached, the status indicator indicates as much. In an illustrative embodiment of the present invention, the status indicator is a 4-bit word having the meanings shown in Table 1.

TABLE 1

| Status Code [3:0] | Meaning |
|---|---|
| 0001 | Escape code followed by run length code |
| 0010 | Special Codeword 1 |
| 0011 | Special Codeword 2 |
| 0100 | CodeWord Found |
| 0101 | Goto Next Level Code Search @ Code RAM |
| 0110 | Goto Next Level Code Search @ Decoder Memory |
| 0111 | Error has been detected |
| 1000 | Goto Next Level Code Search @ System Memory |
| others | reserved |

As mentioned above, if the code table entry represents a codeword match (status=0100), the information/offset value represents the meaning of the codeword. If the code table entry does not represent a codeword match, and the next search is to be performed in local memory (status=0101), the information/offset value represents the start address of the next search level at local memory 614 (code RAM). If the code table entry does not represent a codeword match, and the next search is to be performed in decoder memory (status=0110), the information/offset value represents the offset of the secondary code table at the decoder memory 316. If the entry does not represent a codeword match, and the next search is to be performed in system memory (status=1000), the information/offset value represents the offset of the tertiary code table at the system memory 110.

In an illustrative embodiment, the current code-length indicator indicates the number of bits that the input bitstream should be shifted prior to the next codeword search. If the code table entry represents a codeword match, the current code-length represents the number of bits, out of the currently searched group of bits, that correspond to the matched information represented by the information/offset value. If the code table entry does not represent a codeword match, the current code-length indicator indicates the number of bits that were consumed in the current stage of search. If the entry represents an error, the current code-length indicator indicates that no bits in the current search have been matched. In an alternative embodiment, the current code-length indicator indicates the number of bits consumed from the input bit stream when the status indicates a match, and it indicates the number of bits to be searched in the next stage of search when the status indicates no match in the current stage. In such an embodiment the number of bits consumed when there is not a match is implied to be the number of bits searched in the current stage.

In an illustrative embodiment, each code table entry that does not represent a codeword match further includes a next-search-length (NSL) indicator that indicates the number of bits to perform a codeword search for in the next stage. In such an embodiment, the code table entries that do represent a codeword match do not contain a next-search-length indicator, as the search length in the next stage automatically reverts to an initial value. In an alternative embodiment, the code table entries that do represent a codeword match do contain a next-search-length indicator, which indicates the initial value.

In an illustrative embodiment, the end-of-block bit is high if the just-decoded code is the last code in a block of codes to be decoded. In alternative embodiments the end-of-block bit has the opposite polarity, or the end-of-block bit is not included.

The code table memory 614 and the address generator 612 work together to perform pattern matching on the data stream. When a codeword is matched at a code table entry, the status indicator in the entry will indicate that that is the case. If an accessed code table entry is not a match, the state machine will go to the next stage to keep searching until the codeword is found. If the status indicator shows that an error has occurred, the VLD 306 will stop searching the next codeword, set an error status bit to "1," report the error to the decoder processor 302 and enter an idle state.

Figure 7:
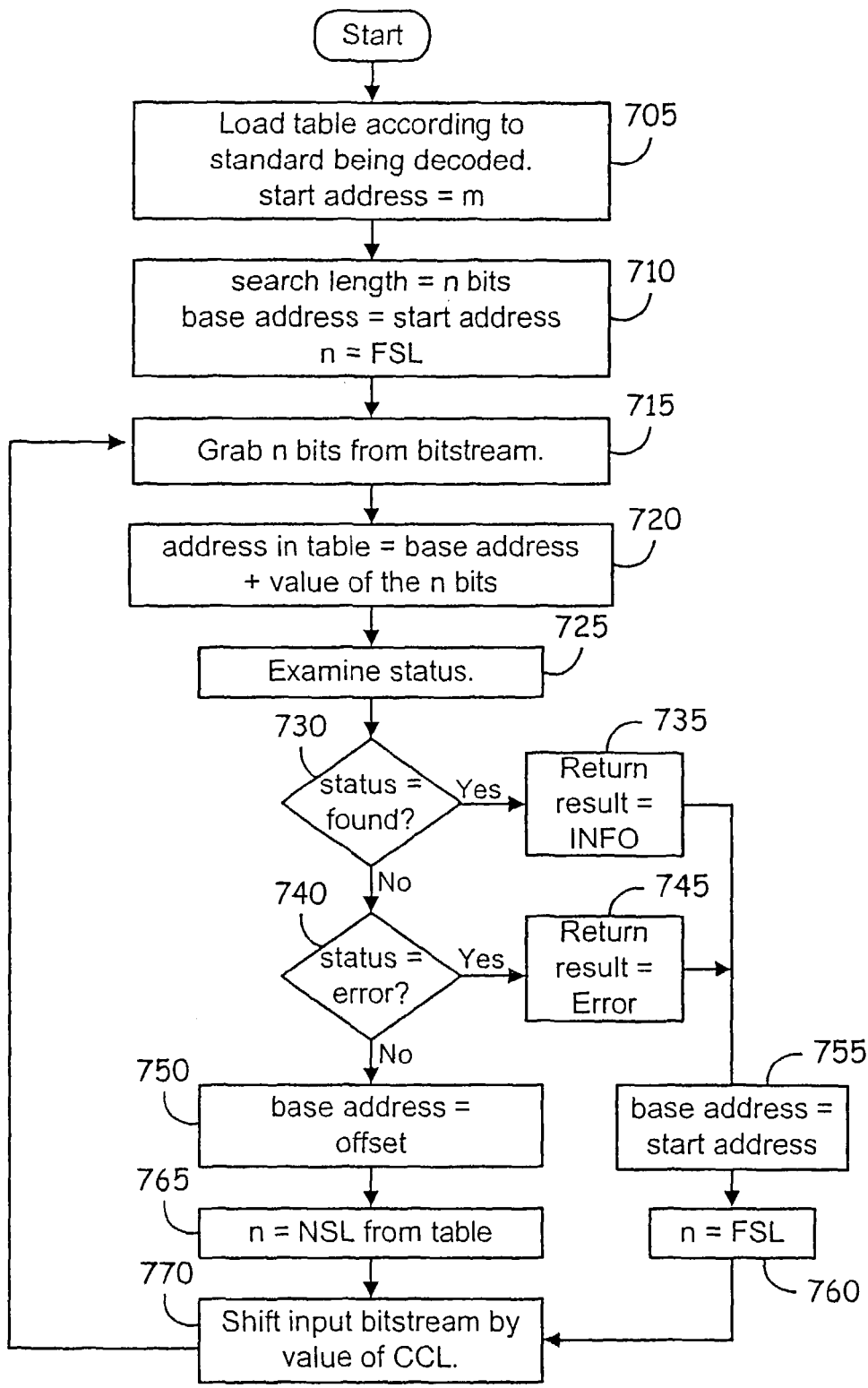
FIG. 7 is a flowchart representing a method of decoding a variable-length code data stream according to an illustrative embodiment of the present invention.

FIG. 7 is a flowchart representing a method of decoding a variable-length code data stream according to an illustrative embodiment of the present invention. The method implements a code table storage algorithm, and a method of traversing a code table implementing the algorithm, that reduces the storage requirement and enables fast code look-up. At step 705, the appropriate code table is loaded according to the compression/decompression standard of the data stream being decoded. The code table is illustratively loaded into local memory 614. The start address of the code table in the local memory is designated m. At step 710, a base memory address is set equal to the start address. Also at step 710, the search length, n, i.e., the number of bits from the data stream for which a code match is sought in a given search, is initialized as a first search length (FSL) value.

At step 715, the next n bits in the data stream are retrieved. In an illustrative embodiment, these bits are retrieved from the n most significant bits of left shifter 606. At step 720, the address at which to search for a code match is generated by adding the value of the n bits retrieved from the bitstream to the base address. This step is illustratively performed by address generator 612. At step 725, the memory location having the address generated in step 720 is accessed, and the status indicator at that memory location is examined. Decision box 730 asks whether the status indicator indicates that a codeword match is found. If the answer is yes, the corresponding information (decoded data), indicated by the information/offset value of the memory location, is output. In an illustrative embodiment of the present invention, the decoded data comprises run and level information which implies the value of one or more transform coefficients, such as discrete cosine transform (DCT) coefficients. In alternative embodiments, the decoded data comprises transform coefficients directly, or other information as appropriate to the video compression/decompression standard being decoded.

If the status indicator indicates that a codeword match is not found, decision box 740 asks whether the status indicator indicates that an error has occurred. Such an error would arise, for example, if the memory location arrived at does not correspond to a valid code. If there is an error, an error indication is given, as indicated at step 745. If the status indicator indicates that either a codeword match is found or an error has occurred, the base address is set equal to the start address, as indicated by step 755, and the search length, n, is set equal to the first search length (FSL), as shown at step 760.

If the status indicator indicates that the memory location does not represent a codeword match, and an error has not occurred, the base address is set according to the offset value indicated by the information/offset value, as indicated at step 750, and the search length, n, is set equal to the next-search-length value held in the memory location. In an illustrative embodiment, the search length remains constant throughout the decoding process. In that case, steps 760 and 765 of FIG. 5 can be eliminated.

At step 770, the incoming bitstream is shifted by an amount indicated by the current code-length indicator of the memory location. Step 770 is illustratively performed by left shifter 606. In an illustrative embodiment, if the memory location represents a codeword match, the current code-length indicator indicates the number of the input bits consumed by the most recent search stage in decoding the current code word. In a further illustrative embodiment, if the memory location represents a non-match, the value of the current code-length indicator is equal to n bits (the number of bits for which the current search was performed). In another embodiment, if the status indicator indicates an error, the value of the current code-length indicator is zero. After step 770, the next n bits in the data stream are accessed, as indicated by step 715, and the above-described process is repeated starting at that point. In an exemplary embodiment, this process is iteratively repeated as long as there is data in the data stream to decode.

FIG. 8 is an example of a code table according to the code table storage algorithm of the present invention. In an illustrative embodiment of the present invention, the code table of FIG. 8 is stored in local memory 614. The following codebook (Table 2) is used in the exemplary code table of FIG. 8:

TABLE 2

| Codeword | Code Length | Decoded Symbol |
|---|---|---|
| 1 | 1 | A |
| 010 | 3 | B |
| 011 | 3 | C |
| ... | | |
| 00010 | 5 | X |
| 000110 | 6 | Y |
| 000111 | 6 | Z |

Each of the addresses 800 in the code table of FIG. 8 represents a codebook entry. The other columns 810, 820, 830, 840 and 850 represent elements of each codebook entry. These elements include current code-length indicator 810, next-search-length indicator 820, end-of-block bit 830, status indicator 840 and information/offset value 850. The illustrative code table of FIG. 8 has a first search length (FSL) of 3 and a starting address (FSA) of 0.

To demonstrate how the code table of FIG. 8 is structured and to demonstrate how it is traversed in order to decode a variable-length bitstream, assume the bits in the most-significant position of left shifter 606 are the bits 1010 (which we know, from referring to the codebook of Table 2, represent symbols A and B). The codeword search engine decodes these bits as follows. Because the first search length is 3, the first three bits of the data stream (101) are pulled from the data stream, that is, from the left shifter 606. The address generator 612 adds the value of these bits (5) to the starting address (0) to get a search address of 5. The code table entry at address 5 has a status indicator=0100, which indicates that the entry represents a codeword match (see table 1). Therefore, the information/offset value (A) of the entry is outputted as a decoded value. In an illustrative embodiment of the present invention, the decoded data comprises transform coefficients, such as discrete cosine transform (DCT) coefficients. In an illustrative embodiment, this decoded value is provided to decoder memory 316 and stored there. The current-code-length indicator of the entry at address 5 is a 1. This value is provided to accumulator 610 and register $D_2$ 608, indicating that one bit (the first 1, corresponding to the outputted A) was decoded in this stage.

Therefore, in the next stage, prior to performing the next search, the left shifter 606 shifts its contents one bit, putting the bits 010 at the three most-significant positions of left shifter 606. The search length is three (the first search length) because the previous search resulted in a codeword match. Thus, the bits 010 are provided to the address generator 612, which adds the value of these bits (2) to the starting address (0) to get a search address of 2 (the starting address is used as the base address because the previous search yielded a match). The code table entry at address 2 has a status indicator=0100, which indicates that the entry represents a codeword match. Therefore the information/offset value (B) is outputted as a decoded value. Hence, the input string 1010 has been decoded as AB. The current-code-length indicator of the entry at address 2 is a 3. This value is provided to accumulator 610 and register $D_2$ 608, indicating that three bits (010, corresponding to the outputted B) were decoded in this stage.

Say, for example, the next bits in the data stream (after the bits 1010) are 00010010 (which represent symbols X and B). Because the value stored in register $D_2$ 608 from the previous search is 3, prior to performing the next search, the left shifter 606 shifts its contents three bits, putting the bits 000 at the three most-significant positions of left shifter 606. The search length is three (the first search length) because the previous search resulted in a codeword match. Thus, the bits 000 are provided to the address generator 612, which adds the value of these bits (0) to the starting address (0) to get a search address of 0 (the starting address is used as the base address because the previous search yielded a match). The code table entry at address 0 has a status indicator=0101, which indicates that the entry does not represent a codeword match. Therefore, the information/offset value (8) is provided to address generator 612 to be used in calculating the base address of the next search. The code table entry at address 0 has a next search-length indicator of 3. This value is provided to address generator 612 to indicate the number of bits to be retrieved from the left shifter 606 for the next search. The current-code-length indicator of the entry at address 0 is a 3. This value is provided to accumulator 310 and register $D_2$ 608, indicating that the left shifter 606 should shift its contents three bits prior to the next codeword search.

Shifting the contents of left shifter 606 by the indicated three bits puts the bits 100 at the three most-significant positions of left shifter 606. The search length is three, as indicated to the address generator 612 by the next-search-length indicator from the previous stage. Thus, the bits 100 are provided to the address generator 612, which adds the value of these bits (4) to the base address to get the search address. The base address is equal to the start address (0) plus the offset value (8) indicated by the information/offset value from the previous stage. Thus the search address=0+8+4=12. The code table entry at address 12 has a status indicator=0100, which indicates that the entry represents a codeword match. Therefore the information/offset value (X) is outputted as a decoded value. The current-code-length indicator of the entry at address 12 is a 2. This value is provided to accumulator 610 and register $D_2$ 608, indicating that two bits (10, which are the first two bits of the just-searched bits and which are also the last two bits of the just-decoded codeword) were decoded in this stage.

Therefore, in the next stage, prior to performing the next search, the left shifter 606 shifts its contents two bits, putting the bits 010 at the three most-significant positions of left shifter 606. The search length is three (the first search length) because the previous search resulted in a codeword match. Thus, the bits 010 are provided to the address generator 612, which adds the value of these bits (2) to the starting address (0) to get a search address of 2 (the starting address is used as the base address because the previous search yielded a match). The symbol B is decoded at the code table entry at address 2, as was described above.

In an illustrative embodiment of the present invention, multiple memory units are used to store the codeword look-up table. For example, in one embodiment, part of the codeword look-up table is stored in local memory 614, part is stored in decoder memory 316, and part is stored in system memory 110. The shortest, and therefore most common, codes are stored in local memory 614, enabling the majority of codeword searches to be performed quickly and efficiently. The next shortest codes are stored in decoder memory 316 and the longest codes are stored in system memory 110. In this embodiment, the status indicator of each code table entry indicates the memory unit at which to perform the next search if the current search did not result in a codeword match. If the current search did produce a codeword match, the status indicator indicates that condition and the next search will be performed in local memory unit 614. The first search for a data stream, and each search following a codeword match are performed in the local memory unit 614.

In the case of block decoding, the VLD 306 will continue decoding the bitstream as long as there is space available in the block buffer 406. In order to simplify the design, in an illustrative embodiment of the present invention, the VLD 306 checks the buffer availability before starting to decode a block. When the VLD 306 is finished decoding a block, the VLD 306 transfers the data to the block buffer 406. This processing continues until a block count is reached. In an illustrative embodiment, a double buffer scheme is used in order to support high definition (HD) performance.

Referring again to FIG. 3, picture-level processing, from the sequence level down to the macroblock level, including the sequence headers, picture headers, time stamps, and buffer management, are performed directly and sequentially by the core processor 302. The VLD 306 assists the core processor when a bit-field in a header is to be decoded. In an illustrative embodiment picture level processing does not overlap with slice level (macroblock) decoding. In an alternative embodiment, some slice level or macroblock decoding processes may be performed concurrently with the picture level processing.

The macroblock level decoding is the main video decoding process. In an illustrative embodiment of the present invention it occurs within a direct execution loop. In such an embodiment, hardware blocks VLD 306, IQ 308, IDCT module 309, pixel filter 310, motion compensation module 312 (and possibly loop filter 313) are all involved in the decoding loop. The core processor 302 controls the loop by polling the status of each of the hardware blocks involved.

Figure 9:
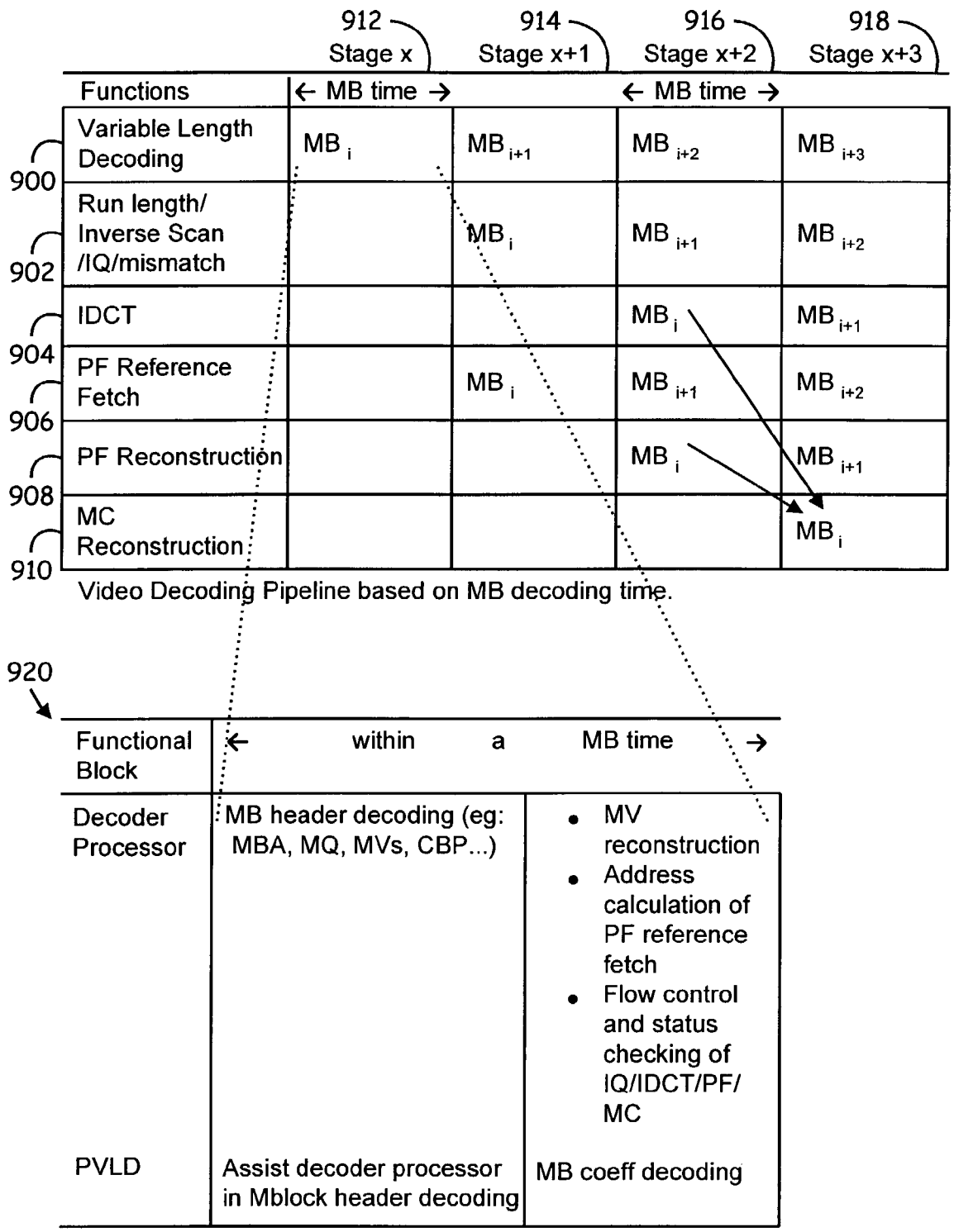
FIG. 9 is a chart representing a decoding pipeline according to an illustrative embodiment of the present invention.

In an illustrative embodiment of the present invention, the actions of the various hardware blocks are arranged in an execution pipeline. The pipeline scheme aims to achieve maximum utilization of the core processor 302. FIG. 9 is a chart representing a decoding pipeline according to an illustrative embodiment of the present invention. The number of pipeline stages may vary depending on the target applications. Due to the selection of hardware elements that comprise the pipeline, the pipeline architecture of the present invention can accommodate substantially any existing or future compression algorithms that fall into the general class of DCT-based, variable-length coded, block-motion compensated algorithms.

The rows of FIG. 9 represent the decoding functions performed as part of the pipeline according to an exemplary embodiment. Variable length decoding 900 is performed by VLD 306. Run length/inverse scan/IQ/mismatch 902 are functions performed by IQ module 308. IDCT operations 904 are performed by IDCT module 309. Pixel filter reference fetch 906 and pixel filter reconstruction 908 are performed by pixel filter 310. Motion compensation reconstruction 910 is performed by motion compensation module 312. The columns of FIG. 9 represent the pipeline stages. The designations $MB_i$, $MB_{i+1}$, $MB_{i+2}$, etc. represent the $i^{th}$ macroblock in a data stream, the $i+1^{st}$ macroblock in the data stream, the $i+2^{nd}$ macroblock, and so on. The pipeline scheme supports one pipeline stage per module, wherein any hardware module that depends on the result of another module is arranged in an immediately following MB pipeline stage.

At any given stage in the pipeline, while a given function is being performed on a given macroblock, the next macroblock in the data stream is being worked on by the previous function in the pipeline. Thus, at stage x 912 in the pipeline represented in FIG. 9, variable length decoding 900 is performed on $MB_i$. Exploded view 920 of the variable length decoding function 900 demonstrates how functions are divided between the core processor 302 and the VLD 306 during this stage, according to one embodiment of the present invention. Exploded view 920 shows that during stage x 912, the core processor 302 decodes the macroblock header of $MB_i$. The VLD 306 assists the core processor 302 in the decoding of macroblock headers. The core processor 302 also reconstructs the motion vectors of $MB_i$, calculates the address of the pixel filter reference fetch for $MB_i$, performs pipeline flow control and checks the status of IQ module 308, IDCT module 309, pixel filter 310 and motion compensator 312 during stage x 912. The hardware blocks operate concurrently with the core processor 302 while decoding a series of macroblocks. The core processor 302 controls the pipeline, initiates the decoding of each macroblock, and controls the operation of each of the hardware accelerators. The core processor firmware checks the status of each of the hardware blocks to determine completion of previously assigned tasks and checks the buffer availability before advancing the pipeline. Each block will then process the corresponding next macroblock. The VLD 306 also decodes the macroblock coefficients of $MB_i$ during stage x. Block coefficient VLC decoding is not started until the core processor 302 decodes the whole macroblock header. Note that the functions listed in exploded view 920 are performed during each stage of the pipeline of FIG. 9, even though, for simplicity's sake, they are only exploded out with respect to stage x 912.

At the next stage x+1 914, the inverse quantizer 308 works on $MB_i$ (function 902) while variable length decoding 900 is performed on the next macroblock, $MB_{i+1}$. In stage x+1 914, the data that the inverse quantizer 308 works on are the quantized DCT coefficients of $MB_i$ extracted from the data stream by the VLD 306 during stage x 912. In an exemplary embodiment of the present invention, also during stage x+1 914, the pixel filter reference data is fetched for $MB_i$ (function 906) using the pixel filter reference fetch address calculated by the core processor 302 during stage x 912.

Then, at stage x+2 916, the IDCT module 309 performs IDCT operations 904 on the $MB_i$ DCT coefficients that were output by the inverse quantizer 308 during stage x+1. Also during stage x+2, the pixel filter 310 performs pixel filtering 908 for MB$_i$ using the pixel filter reference data fetched in stage x+1 914 and the motion vectors reconstructed by the core processor 302 in stage x 912. Additionally at stage x+2 916, the inverse quantizer 308 works on MB$_{i+1}$ (function 902), the pixel filter reference data is fetched for MB$_{i+1}$ (function 906), and variable length decoding 900 is performed on MB$_{i+2}$.

At stage x+3 918, the motion compensation module 312 performs motion compensation reconstruction 910 on MB$_i$ using decoded difference pixel information produced by the IDCT module 309 (function 904) and pixel prediction data produced by the pixel filter 310 (function 908) in stage x+2 916. Also during stage x+3 918, the IDCT module 309 performs IDCT operations 904 on MB$_{i+1}$, the pixel filter 310 performs pixel filtering 908 for MB$_{i+1}$, the inverse quantizer 308 works on MB$_{i+2}$ (function 902), the pixel filter reference data is fetched for MB$_{i+2}$ (function 906), and variable length decoding 900 is performed on MB$_{i+3}$. While the pipeline of FIG. 9 shows just four pipeline stages, in an illustrative embodiment of the present invention, the pipeline includes as many stages as is needed to decode a complete incoming data stream with adequate performance.

In an alternative embodiment of the present invention, the functions of two or more hardware modules are combined into one pipeline stage, and the macroblock data is processed by all the modules in that stage sequentially. For example, in an exemplary embodiment, IDCT operations for a given macroblock are performed during the same pipeline stage as IQ operations. In this embodiment, the IDCT module 309 waits idle until the inverse quantizer 308 finishes, and the inverse quantizer 308 becomes idle when the IDCT operations start. This embodiment will have a longer processing time for the "packed" pipeline stage, assuming the same performance of each individual function. Therefore, in an illustrative embodiment of the present invention, the packed pipeline stage is used only in non-demanding decoding tasks such SD (standard definition) or SIF (standard interchange format) size decoding applications. In a further illustrative embodiment using packed stages, different operations such as IQ and IDCT functions are performed by a configurable common block hardware at different times. The benefits of the packed stage embodiment include fewer pipeline stages, fewer buffers and possibly simpler control for the pipeline.

The above-described macroblock-level pipeline advances stage-by-stage. Conceptually, the pipeline advances after all the tasks in the current stage are completed. The time elapsed in one macroblock pipeline stage will be referred to herein as the macroblock (MB) time. In the general case of decoding, the MB time is not a constant and varies from stage to stage. It depends on the encoded bitstream characteristics and possibly other factors, and is determined by the bottleneck module, which is the one that finishes last in that stage. Any module, including the core processor 302 itself, could be the bottleneck from stage to stage, and it is not predetermined at the beginning of each stage. In an illustrative embodiment of the present invention, the bottleneck time is reduced by means of firmware control, improving the throughput and directly contributing to performance enhancement.

However, for a given encoding/decoding algorithm, each module, including the core processor 302, has a defined and predetermined task or group of tasks. The maximum number of clock cycles needed for each module to decode decoding of a specific, e.g. worst case, stream can be predetermined. The macroblock time for each module is substantially constant for streams with a given set of characteristics. Therefore, in an illustrative embodiment of the present invention, the hardware acceleration pipeline is optimized by hardware balancing each module in the pipeline according to the compression format of the data stream.

The main video decoding operations occur within a direct execution loop with polling of the accelerator functions. The coprocessor/accelerators operate concurrently with the core processor while decoding a series of macroblocks. The core processor 302 controls the pipeline, initiates the decoding of each macroblock, and controls the operation of each of the accelerators. Upon completion of each macroblock processing stage in the core processor, firmware checks the status of each of the accelerators to determine completion of previously assigned tasks. In the event that the firmware gets to this point before an accelerator module has completed its required tasks, the firmware polls for completion. This is appropriate, since the pipeline cannot proceed efficiently until all of the pipeline elements have completed the current stage, and an interrupt driven scheme would be less efficient for this purpose.

Each hardware module 306, 308, 309, 310, 312, 313, 315 is independently controllable by the core processor 302. The core processor 302 drives a hardware module by issuing a certain start command after checking the module's status. In one embodiment, the core processor 302 issues the start command by setting up a register in the hardware module.

Figure 10:
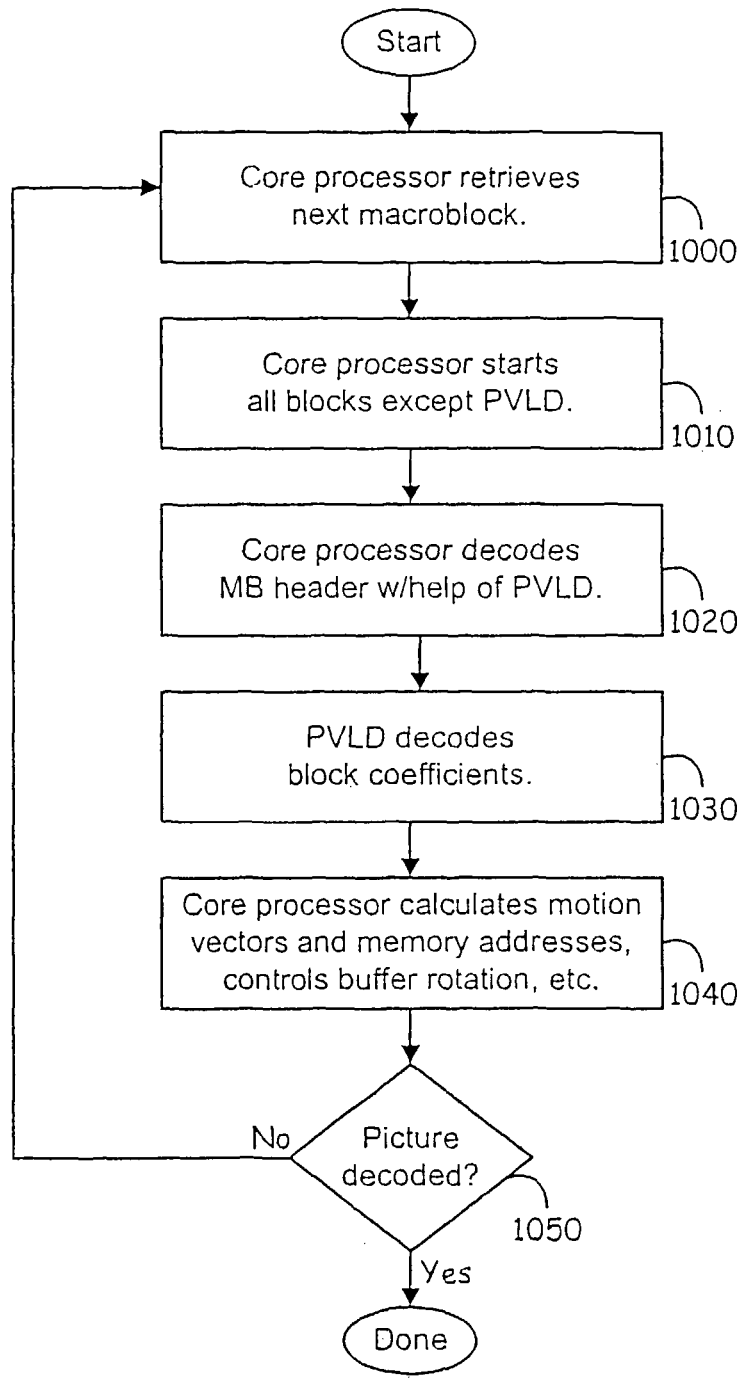
FIG. 10 is a flowchart representing a macroblock decoding loop according to an illustrative embodiment of the present invention.

FIG. 10 is a flowchart representing a macroblock decoding loop according to an illustrative embodiment of the present invention. FIG. 10 depicts the decoding of one video picture. In an illustrative embodiment of the present invention, the loop of slice/macroblock level decoding pipeline control is fully synchronous. At step 1000, the core processor 302 retrieves a macroblock to be decoded from system memory 110. At step 1010, the core processor starts all the hardware modules except the VLD 306. At step 1020, the core processor 302 decodes the macroblock header with the help of the VLD 306. At step 1030, when the macroblock header is decoded, the core processor 302 starts the VLD 306 for block coefficient decoding. At step 1040, the core processor 302 calculates motion vectors and memory addresses, such as the pixel filter reference fetch address, controls buffer rotation and performs other housekeeping tasks. At decision box 1050, if the picture is decoded, the process is complete. If the picture is not decoded, the core processor 302 retrieves the next macroblock, and the process continues as shown by step 1000. In an illustrative embodiment of the present invention, when the current picture has been decoded, the incoming macroblock data of the next picture in the video sequence is decoded according to the process of FIG. 10.

In general, the core processor 302 interprets the bits decoded (with the help of the VLD 306) for the appropriate headers and sets up and coordinates the actions of the hardware modules. More specifically, all header information, from the sequence level down to the macroblock level, is requested by the core processor 302. The core processor 302 also controls and coordinates the actions of each hardware module. The core processor configures the hardware modules to operate in accordance with the encoding/decoding format of the data stream being decoded by providing operating parameters to the hardware modules. The parameters include but are not limited to (using MPEG-2 as an example) the cbp pattern used by the VLD 306 to decode the macroblock coefficients, the quantization scale used by the IQ module 308 to perform inverse quantization, motion vectors used by the pixel filter 309 and motion compensation module 310 to reconstruct the macroblocks, and the working buffer address(es) in decoder memory 316.

Each hardware module 306, 308, 309, 310, 312, 313, 315 performs the specific processing as instructed by the core processor 302 and sets up its status properly in a status register as the task is being executed and when it is done. Each of the modules has or shares a status register that is polled by the core processor to determine the module's status. Each hardware module is assigned a set of macroblock buffers in decoder memory 316 for processing purposes. Each hardware module signals the busy/available status of the working buffer(s) associated with it so that the core processor 302 can properly coordinate the processing pipeline.

In an exemplary embodiment of the present invention, the hardware accelerator modules 306, 308, 309, 319, 312, 313, 315 generally do not communicate with each other directly. The accelerators work on assigned areas of decoder memory 316 and produce results that are written back to decoder memory 316, in some cases to the same area of decoder memory 316 as the input to the accelerator. In one embodiment of the present invention, when the incoming bitstream is of a format that includes a relatively large amount of data, or of a relatively complex encoding/decoding format, the accelerators in some cases may bypass the decoder memory 316 and pass data between themselves directly.

Software codes from other sources, such as proprietary codes, are ported to the decoding system 300 by analyzing the code to isolate those functions that are amenable to acceleration, such as variable-length decoding, run-length coding, inverse scanning, inverse quantization, transform, pixel filter, motion compensation, de-blocking filter, and display format conversion, and replacing those functions with equivalent functions that use the hardware accelerators in the decoding system 300. All other video decoding software is compiled to run directly on the core processor.

Figure 11:
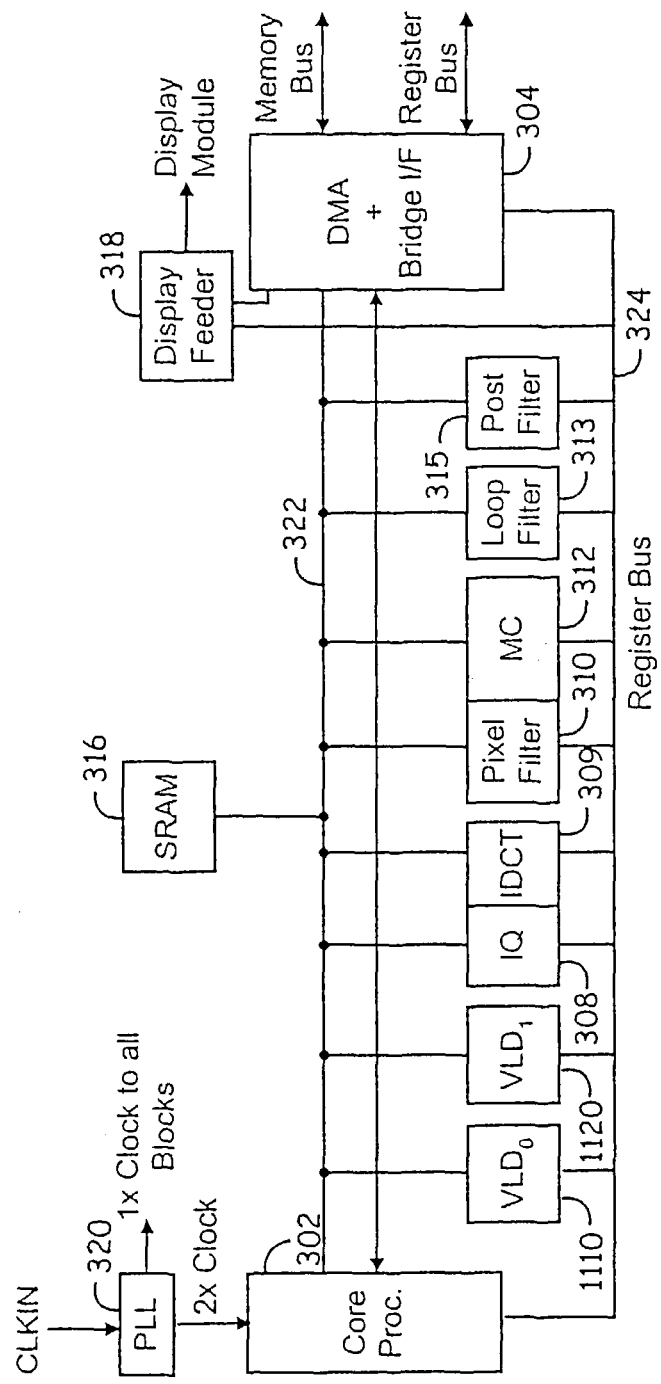
FIG. 11 is a functional block diagram of a digital video decoding system according to an illustrative embodiment of the present invention.

FIG. 11 is a functional block diagram of a digital video decoding system 1100 according to an illustrative embodiment of the present invention. Video decoding system 1100 is similar to the video decoding system 300 shown in FIG. 3, but includes two variable-length decoders, $VLD_0$ 1110 and $VLD_1$ 1120. The other elements of FIG. 11 are equivalent to the elements shown and described with respect to FIG. 3. In an illustrative embodiment, both of the variable-length decoders 1110 and 1120 are programmable to decode bitstreams of a plurality of compression/decompression standards. In this case, each of the variable-length decoders 1110 and 1120 has a code RAM to hold VLC tables for various video coding formats. In an alternative embodiment, one of the variable-length decoders 1110 and 1120 is programmable to operate according to a plurality of compression/decompression standards, and the other variable-length decoder is hardwired to efficiently perform decoding according to one or more particular compression standards, such as MPEG-2 HD. In another embodiment, both of the variable-length decoders 1110 and 1120 are hardwired to efficiently perform decoding according to one or more particular compression standards. In still another embodiment, one or both of the two VLDs 1110 and 1120 is hardwired to decode bitstreams according to one or more particular standards and can also be optionally set as a programmable VLD engine, with a code RAM to hold VLC tables for other video coding formats. In the embodiments wherein a variable-length decoder is hard-wired, the VLD includes a bard-coded coefficient decoder and a hard-coded code look-up table. The two VLD engines 1110 and 1120 are controlled independently by the core processor 302, and either one or both of them will be employed at any given time, depending on the application.

In an exemplary embodiment of the present invention, the two variable-length decoders 1100 and 1110 are employed concurrently to decode the same bitstream. In one embodiment, the two variable-length decoders are used in an alternating fashion to decode incoming macroblocks. That is $VLD_0$ 1110 is used to decode a first macroblock, $VLD_1$ 1120 is used to decode a second macroblock, $VLD_0$ 1100 is used to decode the third macroblock, and so on. In an illustrative embodiment, two rows of a video frame are decoded concurrently, with one row being decoded by one VLD, and the other row being decoded by the other VLD. FIG. 12 is a chart representing a decoding pipeline according to an illustrative embodiment of the present invention. The rows of FIG. 12 represent the functions performed by the core decoder processor 302, $VLD_0$ 1110 and $VLD_1$ 1120 as part of the pipeline, according to an exemplary embodiment. Row 1200 shows the functions performed by the core processor 302, row 1202 shows the functions performed by $VLD_0$ 1110, and row 1204 shows the functions performed by $VLD_1$ 1120. The columns of FIG. 12 represent the pipeline stages.

As can be seen in FIG. 12, the variable-length decoding of each macroblock is performed by one of the two VLDs 1110 and 1120 over two decoding stages. For a given macroblock, in a first stage, the assigned VLD assists the core processor 302 in decoding the macroblock header. In the next stage, the same VLD performs macroblock coefficient decoding for the same macroblock, while the other VLD assists the core processor 302 in decoding the macroblock header of a macroblock in a different row. In the example of FIG. 12, at stage x 1206, the decoder processor 302 performs macroblock header decoding on the first macroblock of $row_0$ ($row_0$, $column_0$). Simultaneously, $VLD_0$ 1110 assists the core processor 302 in the decoding of the macroblock header of the same macroblock ($row_0$, $column_0$) data. At the next stage x+1 1208, the decoder processor 302 performs macroblock header decoding on the first macroblock of $row_1$ ($row_1$, $column_0$), and $VLD_1$ 1120 assists the core processor 302 in the decoding of the macroblock header of the same macroblock ($row_1$, $column_0$) data. Also during stage x+1, $VLD_0$ 1110 performs macroblock coefficient decoding for the first macroblock of $row_0$ ($row_0$, $column_0$), whose header was decoded by $VLD_0$ in stage x. At stage x+2 1208, the decoder processor 302 performs macroblock header decoding on the second macroblock of $row_0$ ($row_0$, $column_0$), and $VLD_0$ 1110 assists the core processor 302 in the decoding of the macroblock header of the same macroblock ($row_0$, $colum_0$) data. Also, during stage x+2, $VLD_1$ 1120 performs macroblock coefficient decoding for the first macroblock of row 1 ($row_1$, $column_0$), whose header was decoded by $VLD_1$ in stage x+1. Decoding continues in this manner.

In the decoding process depicted in FIG. 12, after the macroblock header is decoded for a given macroblock, coefficient decoding for that macroblock is not initiated until the next stage. In an alternative embodiment of the present invention, the variable length decoder that is working on a given macroblock does not wait for the next stage after assisting the core processor 302 in decoding the macroblock header. Rather, when the decoding of the macroblock header is complete, the variable-length decoder begins decoding the macroblock coefficients for that macroblock, regardless of whether or not the next stage is ready to begin. This process will be referred to as cycle stealing.

FIG. 13 is a chart representing a dual-row decoding pipeline employing cycle stealing according to an illustrative embodiment of the present invention. The rows of FIG. 13 represent the decoding functions performed as part of the pipeline, according to an exemplary embodiment of the present invention. The functions include core processor operations 1300, variable-length decoding performed by $VLD_0$ 1302, variable-length decoding performed by $VLD_1$ 1304, inverse quantizer operations 1306, IDCT operations 1308, pixel filter reference fetch 1310, pixel filter reconstruction 1312, motion compensation 1314 and DMA operations 1316. The columns of FIG. 13 represent the pipeline stages. The designation (i, j) denotes the macroblock coordinates, i.e., the $j^{th}$ MB in the $i^{th}$ row.

As shown in FIG. 13, in stage 1, the core processor 302 and $VLD_0$ 1110 work on $MB_{0,0}$ ($MB_0$ in $row_0$). Note that, first, the core processor 302 performs macroblock header decoding with the assistance of $VLD_0$ 1110. When the macroblock header is decoded, the core processor 302 continues performing other tasks, while $VLD_0$ 1110 begins decoding the block coefficients of $MB_{0,0}$. When the core processor 302 completes the tasks that it is performing with respect to $MB_{0,0}$ the core processor 302 initiates stage 2, regardless of whether $VLD_0$ 1110 has finished decoding the block coefficients of $MB_{0,0}$. In an alternative embodiment of the present invention, after assisting the core processor 302 with decoding the macroblock header, $VLD_0$ 1110 waits until stage 2 to begin decoding the block coefficients of $MB_{0,0}$, as depicted in FIG. 12.

In stage 2, the core processor 302 and $VLD_1$ 1120 work on $MB_{1,0}$ ($MB_0$ in $row_1$). First the core processor 302 performs macroblock header decoding on $MB_{1,0}$ with the assistance of $VLD_1$ 1120. When the macroblock header is decoded, the core processor 302 continues performing other tasks while $VLD_1$ 1120 begins decoding the block coefficients of $MB_{1,0}$. Also in stage 2, if $VLD_0$ 1110 did not finish decoding the block coefficients of $MB_{0,0}$ in stage 1, it ($VLD_0$ 1110) continues to do so in stage 2. In the alternative embodiment mentioned above with respect to stage 1, $VLD_0$ 1110 waits until stage 2 to begin decoding the block coefficients of $MB_{0,0}$. When the core processor 302 completes the tasks that it is performing with respect to $MB_{1,0}$, the core processor 302 polls $VLD_0$ 1110 to see if it is done decoding the block coefficients of $MB_{0,0}$. If $VLD_0$ 1110 is done with $MB_{0,0}$, the core processor 302 initiates stage 3, regardless of whether $VLD_1$ 1120 has finished decoding the block coefficients of $MB_{1,0}$. If $VLD_0$ 1110 is not yet finished decoding the block coefficients of $MB_{0,0}$, the core processor 302 waits until $VLD_0$ 1110 is finished with $MB_{0,0}$ and initiates stage 3 at that time, again, regardless of whether $VLD_1$ 1120 has finished decoding the block coefficients of $MB_{1,0}$.

In stage 3, the core processor 302 and $VLD_0$ 1110 work on $MB_{0,1}$ ($MB_1$ in $row_0$) as described above with respect to stages 1 and 2. Also in stage 3, IQ module 308 operates on $MB_{0,0}$, performing run-level code decoding, inverse scanning, inverse quantization and mismatch control. The data that the inverse quantizer 308 works on are the quantized DCT coefficients of $MB_{0,0}$, extracted from the data stream by $VLD_0$ 1110 during stage 2. Additionally in stage 3, $VLD_1$ 1120 continues decoding the block coefficients of $MB_{1,0}$, if the decoding was not completed in stage 2. When the core processor 302 completes the tasks that it is performing with respect to $MB_{0,1}$, the core processor 302 polls $VLD_1$ to see if it is done decoding the block coefficients of $MB_{1,0}$. The core processor 302 also polls IQ module 308 to see if it is done operating on $MB_{0,1}$. If $VLD_1$ 1120 is done with $MB_{0,0}$, and IQ module 308 is done with $MB_{0,1}$, the core processor 302 initiates stage 4, regardless of whether $VLD_0$ 1110 has finished decoding the block coefficients of $MB_{0,0}$. If either $VLD_1$ 1120 or IQ module 308 is not yet finished, the core processor 302 waits until $VLD_1$ 1120 and IQ module 308 are both finished and initiates stage 4 at that time. In an exemplary embodiment of the present invention, also during stage 3, the pixel filter reference data is fetched for $MB_{0,0}$ (function 910), using the pixel filter reference fetch address calculated by the core processor 302 during stage 1. In this case, the core processor 302 also polls the pixel filter 310 for completion prior to initiating stage 4.

In stage 4, the core processor 302 works on $MB_{1,1}$ ($MB_1$ in $row_1$), variable-length decoding is initiated on $MB_{1,1}$ by $VLD_1$ 1120, IQ module 308 operates on $MB_{1,0}$, and the pixel filter reference data is fetched for $MB_{1,0}$ (function 910). Also in stage 4, IDCT module 309 performs the inverse transform on the $MB_{0,0}$ coefficients produced by the IQ module 308 in stage 3, and the pixel filter 310 performs pixel filtering 912 for $MB_{0,0}$, using the pixel filter reference data fetched in stage 3 and the motion vectors reconstructed by the core processor 302 in stage 1. Additionally in stage 4, $VLD_0$ 1110 continues decoding the block coefficients of $MB_{0,1}$ if the decoding was not completed in stage 3. When the core processor 302 completes its tasks with respect to $MB_{1,1}$, the core processor 302 polls $VLD_0$ 1110, IQ module 308, IDCT module 309 and pixel filter 310 to see if they have completed their present tasks. If the polled modules have completed their tasks, the core processor 302 initiates stage 5. If any of the polled modules is not yet finished, the core processor waits until they are all finished and initiates stage 5 at that time.

In stage 5, the core processor 302 works on $MB_{0,2}$ ($MB_2$ in $row_0$), variable-length decoding is initiated on $MB_{0,2}$ by $VLD_0$ 1110, IQ module 308 operates on $MB_{0,1}$, IDCT module 309 operates on the $MB_{1,0}$ coefficients, the pixel filter reference data is fetched for $MB_{0,1}$ (function 910), and the pixel filter 310 performs pixel filtering 912 for $MB_{1,0}$. Also in stage 5, the motion compensation module 312 performs motion compensation reconstruction 914 on $MB_{0,0}$, using decoded difference pixel information produced by the IDCT module 309 (function 908) and pixel prediction data produced by the pixel filter 310 (function 912) in stage 4 616. Additionally, in stage 5, $VLD_1$ 1120 continues decoding the block coefficients of $MB_{1,1}$ if the decoding was not completed in stage 4. When the core processor 302 completes its tasks with respect to $MB_{0,2}$, the core processor 302 polls $VLD_1$ 1120, IQ module 308, IDCT module 309, pixel filter 310 and motion compensation module 312 to see if they have completed their present tasks. If the polled modules have completed their tasks, the core processor 302 initiates stage 6. If any of the polled modules is not yet finished, the core processor waits until they are all finished and initiates stage 6 at that time.

In stage 6, the core processor 302 works on $MB_{1,2}$ ($MB_2$ in $row_1$), variable-length decoding is initiated on $MB_{1,2}$ by $VLD_1$ 1120, IQ module 308 operates on $MB_{1,1}$, IDCT module 309 operates on the $MB_{0,1}$ coefficients, the pixel filter reference data is fetched for $MB_{1,1}$ (function 910), the pixel filter 310 performs pixel filtering 912 for $MB_{0,1}$ and the motion compensation module 312 performs motion compensation reconstruction 914 on $MB_{1,0}$. Also in stage 6, the DMA engine 304 places the result of the motion compensation performed with respect to $MB_{0,0}$ in system memory 110. Additionally in stage 5, $VLD_0$ 1110 continues decoding the block coefficients of $MB_{0,2}$ if the decoding was not completed in stage 5. When the core processor 302 completes its tasks with respect to $MB_{1,2}$, the core processor 302 polls $VLD_1$ 1120, IQ module 308, IDCT module 309, pixel filter 310, motion compensation module 312 and DMA engine 304 to see if they have completed their present tasks. If the polled modules have completed their tasks, the core processor 302 initiates stage 7. If any of the polled modules is not yet finished, the core processor waits until they are all finished and initiates stage 7 at that time.

The decoding pipeline described above with respect to FIG. 13 continues as long as there are further macroblocks in the data stream to decode. The dual-row decoding pipeline demonstrated in FIG. 13 can be implemented in any type of decoding scheme (including, e.g., audio decoding) employing any combination of acceleration modules.

Although a preferred embodiment of the present invention has been described, it should not be construed to limit the scope of the appended claims. For example, the present invention is applicable to any type of data utilizing variable-length code, including any media data, such as audio data and graphics data, in addition to the video data illustratively described herein. Those skilled in the art will understand that various modifications may be made to the described embodiment. Moreover, to those skilled in the various arts, the invention itself herein will suggest solutions to other tasks and adaptations for other applications. It is therefore desired that the present embodiments be considered in all respects as illustrative and not restrictive, reference being made to the appended claims rather than the foregoing description to indicate the scope of the invention.

What is claimed is:

1. A video decoding system comprising:
   a decoder processor configured to perform decoding functions on a video data stream;
   a first variable-length decoding accelerator coupled to the decoder processor and configured to perform variable-length decoding operations on macroblock data elements in the video data stream, each macroblock data element representing a macroblock of a video frame, each macroblock data element comprising a macroblock header and coefficient data;
   a second variable-length decoding accelerator coupled to the decoder processor and configured to perform variable-length decoding operations on macroblock data elements in the video data stream; and
   wherein the first and second variable-length decoding accelerators are configured to alternately decode macroblock data elements in the video data stream such that the first variable-length decoding accelerator decodes a macroblock header of one macroblock data element while the second variable-length decoding accelerator decodes coefficient data of another macroblock data element during a first stage of decoding, and the second variable-length decoding accelerator decodes a macroblock header of one macroblock data element while the first variable-length decoding accelerator decodes coefficient data of another macroblock data element during a second stage of decoding.

2. The system of claim 1, wherein each of the variable-length decoding accelerators is configured to decode the macroblock header of each macroblock data element before decoding the coefficient data of the macroblock data element.

3. The system of claim 1, wherein the variable-length decoding accelerators are configured such that the decoding of successive macroblock data elements in the data stream is initiated during corresponding successive variable time periods.

4. The system of claim 3, wherein the variable-length decoding accelerators are configured such that the decoding of each macroblock data element in the data stream is completed before an end of the variable time period that follows the variable time period in which decoding of that macroblock data element was initiated.

5. A video decoding system comprising:
   a decoder processor configured to perform decoding functions on a video data stream;
   a first variable-length decoding accelerator coupled to the decoder processor and configured to perform variable-length decoding operations on variable-length code in the video data stream, wherein the first variable-length decoding accelerator is configured by the decoder processor to decode variable-length codes according to any of a plurality of different decoding formats selected by the decoder processor based at least in part on a coding format of the variable video data stream, wherein the first variable-length decoding accelerator is configured to use for the selected decoding format a variable-length coding table of a plurality of different variable-length coding tables stored in memory that respectively correspond to the plurality of different decoding formats; and
   a second variable-length decoding accelerator coupled to the decoder processor and configured to perform variable-length decoding operations on variable-length code in the video data stream.

6. The system of claim 5, wherein each of the plurality of different variable-length coding tables matches variable-length codes to their corresponding decoded information.

7. The system of claim 5, wherein the first variable-length decoding accelerator further comprises a register that dictates which of the plurality of different variable-length coding tables is to be utilized to decode a variable-length code, wherein the register is programmable to dictate the appropriate different variable-length coding table to be employed.

8. The system of claim 5, wherein the second variable-length decoding accelerator is hard-wired to decode a variable-length code according to a particular decoding method.

9. The system of claim 5, wherein the second variable-length decoding accelerator is configured to decode a variable-length code according to any of the plurality of different decoding formats.

10. A video decoding system comprising:
    a decoder processor configured to perform decoding functions on a video data stream;
    a variable-length decoding accelerator coupled to the decoder processor and configured to perform variable-length decoding operations on a variable-length code in the video data stream;
    wherein the variable-length decoding accelerator is configured by the decoder processor to decode a variable-length code according to any of a plurality of different decoding formats selected by the decoder processor based at least in part on a coding format of the video data stream; and
    wherein the variable-length decoding accelerator is configured to use for the selected decoding format a variable-length coding table of a plurality of different variable-length coding tables stored in memory that respectively correspond to the plurality of different decoding formats.

11. The system of claim 10 wherein each of the plurality of different variable-length coding tables matches variable-length codes to their corresponding decoded information.

12. The system of claim 10, wherein the variable-length decoding accelerator further comprises a register that dictates which of the plurality of different variable-length coding tables is to be utilized to decode the variable-length code, wherein the register is programmable to dictate the appropriate different variable-length coding table to be employed.

13. A video decoding system comprising:
    a decoder processor configured to perform decoding functions on a video data stream; and
    a hardware variable-length decoding accelerator external to the decoder processor and coupled to the decoder processor and configured to perform variable-length decoding operations on a variable-length code in the video data stream, wherein the variable-length decoding accelerator is configurable by the decoder processor to decode variable-length codes according to any of a plurality of different decoding formats selected by the decoder processor based at least in part on a coding format of the video data stream, wherein the hardware variable-length decoding accelerator includes a plurality of different variable-length coding tables stored in memory that respectively correspond to the plurality of different decoding formats.

14. The system of claim 13, wherein each of the plurality of different variable-length coding tables matches variable-length codes to their corresponding decoded information.

15. The system of claim 13, wherein the variable-length decoding accelerator further comprises a register that dictates which of the plurality of different variable-length coding tables is to be utilized to decode the variable-length code, wherein the register is programmable to dictate the appropriate different variable-length coding table to be employed.

16. A method, comprising:
receiving, by a first variable-length decoding accelerator, a first macroblock data element in a video data stream from a decoder processor, the first macroblock data element comprising a first macroblock header and first coefficient data;
receiving, by a second variable-length decoding accelerator, a second macroblock data element in the video data stream from the decoder processor, the second macroblock data element comprising a second macroblock header and second coefficient data;
decoding, by the second variable-length decoding accelerator during a stage of decoding, the second coefficient data after decoding the second macroblock header; and
decoding, by the first variable-length decoding accelerator during the stage of decoding, the first macroblock header while the second variable-length decoding accelerator decodes the second coefficient data.

17. The method of claim 16, further comprising:
receiving, by the second variable-length decoding accelerator, a third macroblock data element in the video data stream from the decoder processor, the third macroblock data element comprising a third macroblock header and third coefficient data;
decoding, by the first variable-length decoding accelerator, the first coefficient data after decoding the first macroblock header; and
decoding, by the second variable-length decoding accelerator, the third macroblock header while the first variable-length decoding accelerator decodes the first coefficient data.

18. The method of claim 16, wherein each macroblock data element represents a macroblock of a video frame.

19. The method of claim 16, further comprising performing, by the decoder processor, decoding functions on the video data stream.

20. A method, comprising:
receiving, by a video processing system, video data of a first coding format;
configuring, by a decoder processor, a variable-length decoding accelerator of the video processing system to use a first variable-length coding table based at least in part on the first coding format;
decoding the video data of the first coding format by the variable-length decoding accelerator;
receiving, by the video processing system, video data of a second coding format differing from the first coding format;
configuring, by the decoder processor, the variable-length decoding accelerator to use a second variable length coding table that is different from the first variable-length coding table based at least in part on the second coding format; and
decoding the video data of the second coding format by the variable-length decoding accelerator.

21. The method of claim 20, wherein configuring the variable-length decoding accelerator of the video processing system to use the first variable-length coding table further comprises setting a first value in a coding table selection register, the first value indicating the first variable-length coding table.

22. The method of claim 20, wherein the first coding format and the second coding format correspond to different discrete cosine transform (DCT)-based, variable-length coded, block-motion-compensated compression algorithms.

23. The system of claim 5, wherein the plurality of different decoding formats correspond to different compression algorithms.

24. The system of claim 10, wherein the plurality of different decoding formats correspond to different discrete cosine transform (DCT)-based compression standards.

* * * * *